(12) United States Patent
Kobayashi et al.

(10) Patent No.: US 11,313,563 B2
(45) Date of Patent: Apr. 26, 2022

(54) HEATING COOKER AND HEATING COOKING METHOD

(71) Applicant: Samsung Electronics Co., Ltd., Suwon-si (KR)

(72) Inventors: Hiroki Kobayashi, Yokomama (JP); Toshihiro Kamii, Yokomama (JP); Yurika Kida, Yokomama (JP); Katsunori Araki, Yokomama (JP); Kahoru Tsujimoto, Yokomama (JP); Kazuo Shimizu, Yokomama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/804,494

(22) Filed: Feb. 28, 2020

(65) Prior Publication Data

US 2020/0278116 A1    Sep. 3, 2020

(30) Foreign Application Priority Data

Feb. 28, 2019  (JP) .............................. JP2019-036821
Feb. 5, 2020   (KR) ......................... 10-2020-0013551

(51) Int. Cl.
*F24C 7/08*     (2006.01)
*F24C 7/04*     (2021.01)
(Continued)

(52) U.S. Cl.
CPC .............. *F24C 7/085* (2013.01); *A23L 5/13* (2016.08); *A23L 5/15* (2016.08); *A47J 27/004* (2013.01);
(Continued)

(58) Field of Classification Search
CPC ..... A23L 5/10; A23L 5/13; A23L 5/15; A23V 2002/00; A47J 2027/043; A47J 27/004;
(Continued)

(56) References Cited

U.S. PATENT DOCUMENTS 5,919,389 A     7/1999  Uehashi et al.
7,619,186 B2 *  11/2009 Cavada ................... F24C 7/082
                                                         219/412
2017/0013681 A1  1/2017 Lee et al.

FOREIGN PATENT DOCUMENTS

EP       0866277 A1      9/1998
JP    2005-077021 A      3/2005
(Continued)

OTHER PUBLICATIONS

Translation of Cited JP2005077021 (Year: 2005).*
(Continued)

*Primary Examiner* — Dana Ross
*Assistant Examiner* — Joseph W Iskra

(57) ABSTRACT

A heating cooker to manage surface and inside temperatures of food. A heating portion heats inside of a heating space where the food material is placed. At least one processor controls the heating portion to perform driving for high-temperature heating after performing driving for low-temperature heating. During the driving for low-temperature heating, the heating portion may heat the inside of the heating space such that an average increase velocity of a reference temperature of the food material is lower than an average increase velocity of the reference temperature of the food material during the driving for high-temperature heating. During the driving for high-temperature heating, the heating portion may heat the inside of the heating space such that an average increase velocity of the reference temperature of the food material is higher than the average increase velocity of the reference temperature of the food material during the driving for low-temperature heating.

13 Claims, 10 Drawing Sheets

(51) Int. Cl.
    *F24C 7/06*     (2006.01)
    *F24C 15/32*     (2006.01)
    *H05B 3/00*     (2006.01)
    *A47J 36/32*     (2006.01)
    *A47J 27/00*     (2006.01)
    *A23L 5/10*     (2016.01)
    *A47J 27/04*     (2006.01)

(52) U.S. Cl.
    CPC ............... *A47J 27/04* (2013.01); *A47J 36/32* (2013.01); *F24C 7/046* (2013.01); *F24C 7/067* (2013.01); *F24C 15/325* (2013.01); *F24C 15/327* (2013.01); *H05B 3/0014* (2013.01); *A23V 2002/00* (2013.01); *A47J 2027/043* (2013.01)

(58) Field of Classification Search
    CPC ........ A47J 27/04; A47J 36/32; A47J 37/0629; A47J 37/0641; F24C 15/325; F24C 15/327; F24C 7/046; F24C 7/067; F24C 7/085; F24C 7/087; H05B 1/0263; H05B 3/0014

USPC .......................................................... 99/331
See application file for complete search history.

(56) References Cited

FOREIGN PATENT DOCUMENTS

| | | |
|---|---|---|
| JP | 5386701 B2 | 1/2014 |
| KR | 10-0225625 B1 | 10/1999 |
| KR | 10-2009-0044749 A | 5/2009 |
| KR | 10-1388897 B1 | 4/2014 |
| KR | 10-2017-0006767 A | 1/2017 |

OTHER PUBLICATIONS

Translation of Cited KR20090044749 (Year: 2009).*
International Search Report in connection with International Application No. PCT/KR2020/002799 dated Jun. 29, 2020, 3 pages.
European Patent Office, "Supplementary European Search Report" dated Nov. 26, 2021, in connection with European Patent Application No. 20763581.4, 8 pages.

* cited by examiner

HEATING COOKER AND HEATING COOKING METHOD

CROSS-REFERENCE TO RELATED APPLICATION

This application is based on and claims priority under 35 U.S.C. § 119 to Japanese Patent Application No. 2019-036821, filed on Feb. 28, 2019 in the Japan Patent Office and Korean Patent Application No. 10-2020-0013551, filed on Feb. 5, 2020, the disclosures of which are incorporated by reference herein in their entireties.

BACKGROUND

1. Field

The disclosure relates to a heating cooker and a heating cooking method.

2. Description of the Related Art

Patent document 1 discloses a heating cooker. The heating cooker includes a heating room for accommodating an object to be heated, the object including food and a container, a high-frequency generator for generating a high frequency for heating the object to be heated, an infrared array sensor for detecting a plurality of temperatures at a viewing angle covering the object to be heated, and a controller for controlling the high-frequency generator to control heating of the object to be heated. The plurality of temperatures detected by the infrared array sensor are input to the controller. The controller determines a temperature of the food among the plurality of temperatures based on a plurality of temperature changes generated by heating (pre-heating) of a first phase on the object to be heated, and controls heating (main heating) of a second phase on the object to be heated based on the determined result.

RELATED ART DOCUMENT (Patent Document 1] Japanese Laid-open Patent Application No. 2013-36635

SUMMARY

When the heating cooker of Patent Document 1 continues to perform driving for low-temperature heating to heat a food material at a relatively low heating temperature upon the heating (main heating) of the second phase, the food material needs to be heated for a long time for a sufficient increase of inside temperature, which may cause excessive drying of the surface of the food material. Meanwhile, when the heating cooker continues to perform driving for high-temperature heating to heat a food material at a relatively high heating temperature, the surface of the food material may be burned due to a rapid rise of temperature or the food material may become excessively hardened. As such, the heating cooker of Patent Document 1 has difficulties in appropriately managing the surface temperature and inside temperature of a food material.

Accordingly, a heating cooking technique capable of appropriately managing a surface temperature and inside temperature of a food material is disclosed below.

Additional aspects of the disclosure will be set forth in part in the description which follows and, in part, will be obvious from the description, or may be learned by practice of the disclosure.

The disclosure relates to a heating cooker. The heating cooker includes a housing forming a heating space where a food material is placed, a heating portion configured to heat inside of the heating space, and at least one processor configured to control the heating portion to perform driving for high-temperature heating on the inside of the heating space after performing driving for low-temperature heating on the inside of the heating space. During the driving for low-temperature heating, the heating portion may heat the inside of the heating space such that an average increase velocity of a reference temperature of the food material is lower than an average increase velocity of the reference temperature of the food material during the driving for high-temperature heating. During the driving for high-temperature heating, the heating portion may heat the inside of the heating space such that an average increase velocity of the reference temperature of the food material is higher than the average increase velocity of the reference temperature of the food material during the driving for low-temperature heating.

Also, the disclosure relates to a heating cooking method of a heating cooker, the heating cooker including a housing forming a heating space where a food material is placed and a heating portion configured to heat inside of the heating space. The heating cooking method includes: controlling the heating portion to perform driving for low-temperature heating to heat inside of the heating space where the food material is placed, and controlling the heating portion to perform driving for high-temperature heating to heat the inside of the heating space after performing the driving for low-temperature heating such that an average increase velocity of a reference temperature of the food material is higher than an average increase velocity of the reference temperature of the food material during the driving for low-temperature heating.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
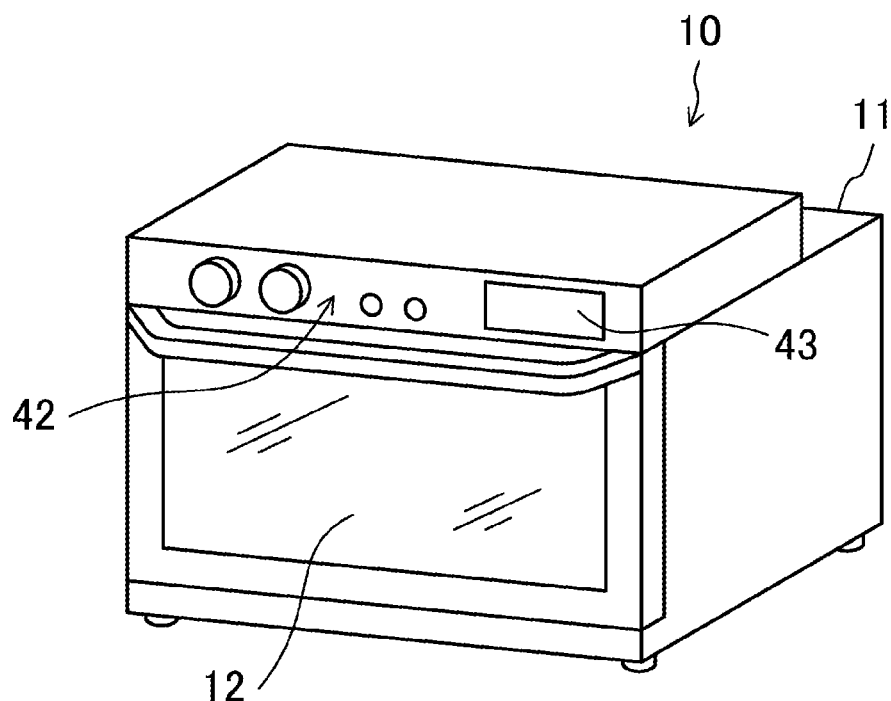
FIG. 1 illustrates a perspective view showing an outer appearance of a heating cooker according to a first embodiment.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Hereinafter, embodiments will be described in detail with reference to the appended drawings. In the drawings, like or similar components will be assigned like reference numerals, and overlapping descriptions thereof will be omitted.

Throughout the disclosure, the expression "at least one of a, b or c" indicates only a, only b, only c, both a and b, both a and c, both b and c, all of a, b, and c, or variations thereof.

Figure 2:
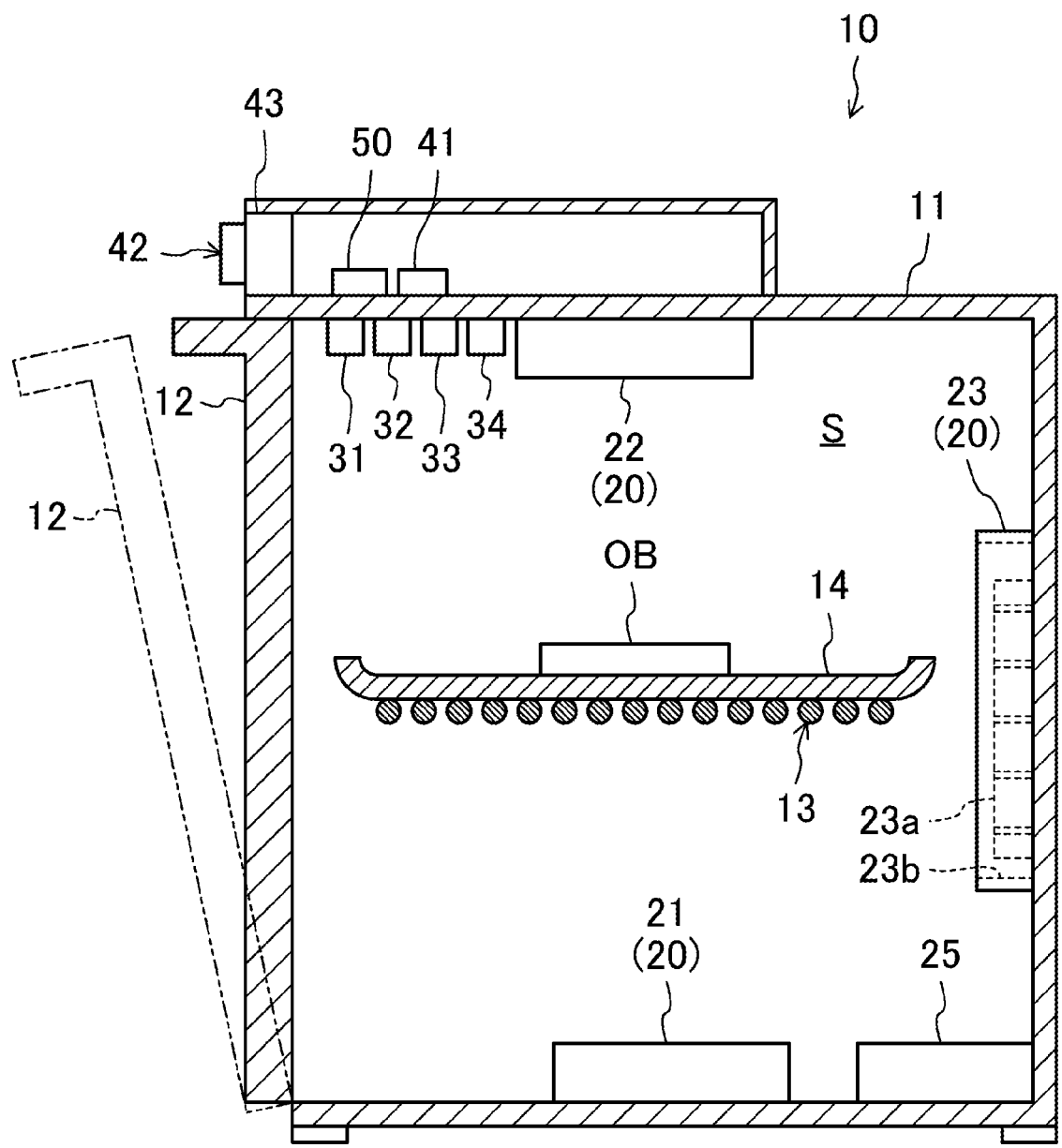
FIG. 2 illustrates a cross-sectional view showing a configuration of the heating cooker according to the first embodiment.

FIGS. 1 and 2 respectively show an outer appearance and configuration of a heating cooker 10 according to a first embodiment. The heating cooker 10 may perform heating and cooking of a food material OB (particularly, a food material containing protein, for example, thickly sliced meat) based on a temperature of the food material OB. In the current embodiment, the heating cooker 10 may include a housing 11, a heating portion 20, a steam generator 25, a thermometer 31, a 3Dimensional (3D) meter 32, a photographing device 33, an inside temperature detector 34, a memory 41, a control panel 42, a display 43, and a controller 50.

Also, in the following description, directions (front, rear, left, right, up, and down) indicate directions when the heating cooker 10 is seen from a front side (a side on which an opening/closing door 12 which will be described later is installed).

In the housing 11, a heating space S may be formed. In the heating space S, a food material OB may be placed. In the current embodiment, the housing 11 may be in a form of a box having a rectangular parallelepiped shape, wherein a front side of the housing 11 opens, and an inside space of the housing 11 may form the heating space S.

On the front side (an opening side) of the housing 11, the opening/closing door 12 may be installed. In the inside space (that is, the heating space S) of the housing 11, a loading rack 13 may be installed. The loading rack 13 may be configured with a plurality of bar-shaped members each extending in a left-right direction and arranged in a front-rear direction, wherein both ends in left-right direction of the loading rack 13 are supported on side walls of the housing 11. On the loading rack 13, a tray 14 may be loaded. The tray 14 may be made of a metal (for example, iron) and formed in a shape of a plate. On the tray 14, a food material OB may be loaded.

The heating portion 20 may heat inside of the heating space S. More specifically, the heating portion 20 may heat inside air of the heating space S. An output of the heating portion 20 may be adjustable. In the current embodiment, the heating portion 20 may include a first heater 21, a second heater 22, and a third heater 23.

The first heater 21 may be mounted on a lower wall (that is, a lower area of the heating space S) of the housing 11, and the second heater 22 may be mounted on a upper wall (that is, a upper area of the heating space S) of the housing 11. For example, each of the first heater 21 and the second heater 22 may be a heating wire emitting heat by application of electricity, an infrared heater emitting infrared light, or a combination of a heating wire and an infrared heater.

The third heater 23 may be mounted on a rear wall (that is, a rear area of the heating space S) of the housing 11. In the current embodiment, the third heater 23 may be so-called a convection heater, and include a centrifugal fan 23a and a heat emitter 23b. The centrifugal fan 23a may rotate to inhale air in a rotation axis direction and emit the air in a diameter direction (that is, a direction that is orthogonal to the rotation axis direction). The rotation axis direction of the centrifugal fan 23a may be a front-rear direction of the housing 11, and an inlet opening of the centrifugal fan 23a may face the front side of the housing 11. The heat emitter 23b may surround the centrifugal fan 23a to heat air emitted from the centrifugal fan 23a. For example, the heat emitter 23b may be a heating wire emitting heat by application of electricity. By rotating the centrifugal fan 23a of the third heater 23, inside air of the heating space S may circulate.

Also, an output of the heating portion 20 may depend on a number of heaters being in a driving state among a plurality of heaters (in the current embodiment, the first heater 21, the second heater 22, and the third heater 23) included in the heating portion 20 and outputs of the heaters being in the driving state. More specifically, when the plurality of heaters included in the heating portion 20 have the same outputs, a larger number of heaters being in a driving state among the plurality of heaters may result in a greater output of the heating portion 20. Also, as the outputs of the heaters being in the driving state among the plurality of heaters included in the heating portion 20 increase, an output of the heating portion 20 may increase accordingly.

Also, each of the plurality of heaters (in the current embodiment, the first heater 21, the second heater 22, and the third heater 23) included in the heating portion 20 may be switched between a continuous driving state for continuous driving and an intermittent driving state for intermittent driving for a predetermined driving time period in a predetermined driving cycle. Also, a ratio of a driving time period to a driving cycle of each of the plurality of heaters may change. For example, when the first heater 21 is switched to the intermittent driving state from the continuous driving state, an output of the first heater 21 may deteriorate. Also, when a ratio of a driving time period to a driving cycle of the first heater 21 being in the intermittent driving state is reduced, an output of the first heater 21 may also deteriorate.

The steam generator 25 may generate steam in the heating space S. For example, the steam generator 25 may be a known steam generator that heats water to generate steam and spurts the steam into the heating space S. More specifically, the steam generator 25 may include a tank storing water, a pump delivering the water stored in the tank, and a heater heating the water delivered by the pump to generate steam. The steam generator 25 may spurt the steam generated by the heater into the heating space S.

The thermometer 31 may measure a temperature of a food material OB. In the current embodiment, the thermometer 31 may measure a surface temperature T1 of the food material OB in a non-contact manner. More specifically, the thermometer 31 may measure a heat distribution of an area (an area to be measured) including the food material OB. For example, the thermometer 31 may be configured with a plurality of infrared sensors each detecting infrared light emitted from an area to be measured. A measured result (information representing the surface temperature T1 of the food material OB measured by the thermometer 31) of the thermometer 31 may be transmitted to the controller 50.

The 3D meter 32 may measure a 3D shape of a food material OB placed inside the heating space S to derive 3D information representing the 3D shape of the food material OB. More specifically, the 3D information may include 3D coordinates representing a 3D shape of an object. For example, the 3D meter 32 may be a known 3D meter, such as a time of flight (TOF) camera or a stereo camera. The 3D information derived by the 3D meter 32 may be transmitted to the controller 50.

The photographing device 33 may photograph an area (an area to be photographed) including a food material OB placed inside the heating space S to derive a photographed image including the food material OB. For example, the photographing device 33 may be a known photographing apparatus, such as a charge-coupled device (CCD) camera or a complementary metal-oxide semiconductor (CMOS) camera. The photographed image derived by the photographing device 33 may be transmitted to the controller 50.

The inside temperature detector 34 may detect an inside temperature (hereinafter, referred to as an inside temperature Tin) of the heating space S. More specifically, the inside temperature detector 34 may detect a temperature of inside air of the heating space S. In the current embodiment, the inside temperature detector 34 may be installed in the heating space S and detect a temperature of air in the heating space S as a temperature of the heating space S. For example, the inside temperature detector 34 may be a known temperature sensor for detecting a temperature of air. A detected result (that is, information representing the inside temperature Tin detected by the inside temperature detector 34) of the inside temperature detector 34 may be transmitted to the controller 50.

The memory 41 may store information. For example, the memory 41 may be a known storage device such as a hard disk. Also, the memory 41 may be installed outside the housing 11. For example, the memory 41 may be an external memory installed outside the housing 11.

In the current embodiment, the memory 41 may store a plurality of photographed images (photographed images including food materials OB) prepared according to a plurality of kinds of food materials OB. By comparing the photographed image (the photographed image including the food material OB placed in the heating space S) derived by the photographing device 33 to the photographed images stored in the memory 41, a kind of the food material OB placed in the heating space S may be identified.

Also, in the current embodiment, the memory 41 may store a plurality of heating cooking models set according to a plurality of combinations of a plurality of kinds and sizes of food materials OB. Also, the sizes of the food materials OB may be thicknesses of the food materials OB, volumes of the food materials OB, surface areas of the food materials OB, weights of the food materials OB, or combinations of at least two thereof. For example, the weights of the food materials OB may be calculated from the volumes of the food materials OB. Also, when a weight detector for detecting a weight of a food material OB is installed in the heating cooker 10, a weight of a food material OB may be calculated from an output of the weight detector. The heating cooking models will be described in detail, later.

The control panel 42 may be operated by a user of the heating cooker 10, and information according to an operation given by the user may be input to the control panel 42. In the current embodiment, an operation for designating a cooking method of a food material OB may be input to the control panel 42. For example, the control panel 42 may be configured with a control button. The information input to the control panel 42 may be transmitted to the controller 50.

The display 43 may display information. In the current embodiment, the display 43 may display setting information about heating and cooking. More specifically, the display 43 may display information representing an output of the heating portion 20 or information representing a time period used for heating and cooking. For example, the display 43 may be a known display such as a liquid crystal display.

Figure 3:
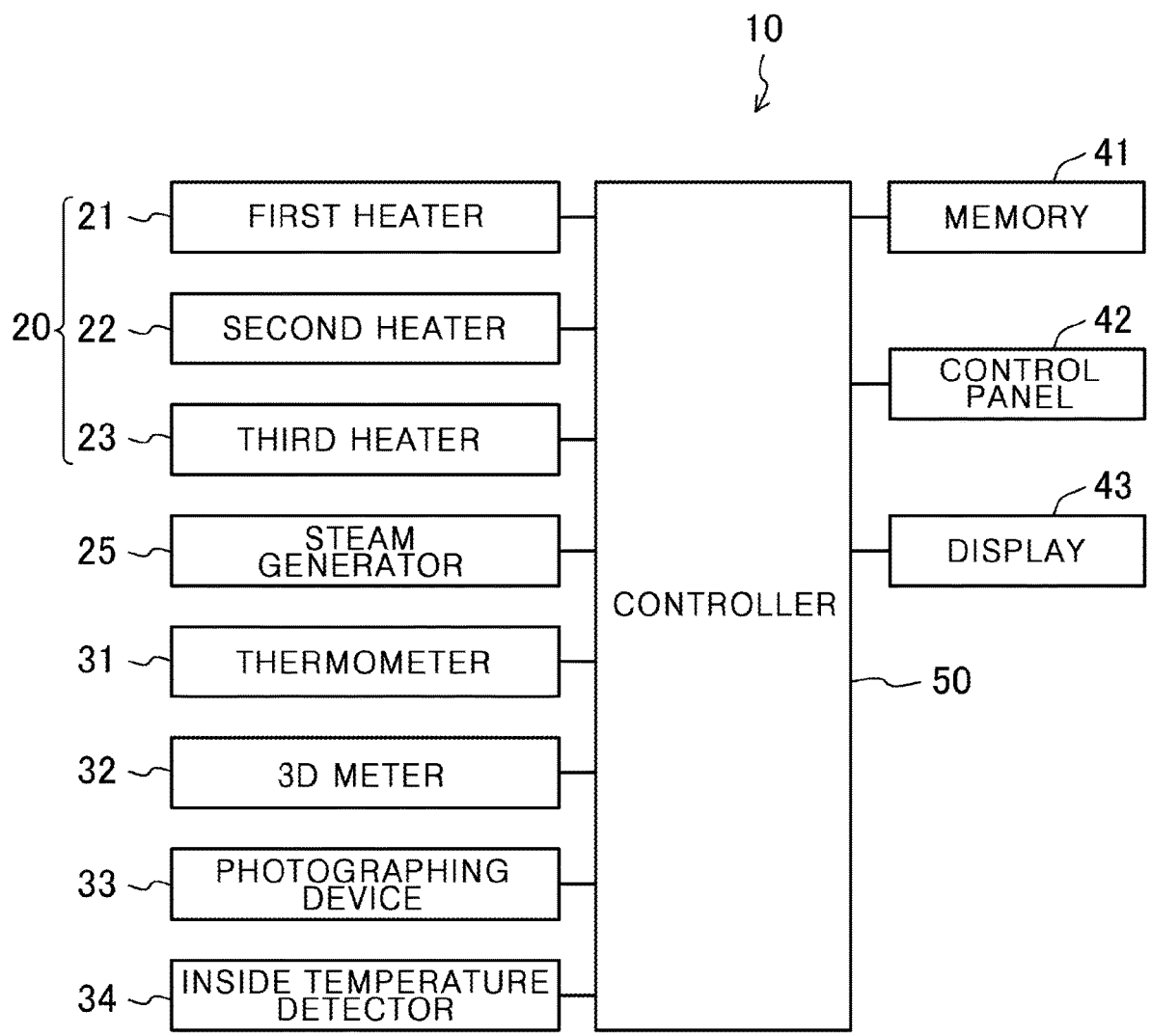
FIG. 3 illustrates a block diagram showing the configuration of the heating cooker according to the first embodiment.

As shown in FIG. 3, the controller 50 may be electrically connected to individual components (in the current embodiment, the heating portion 20, the thermometer 31, the 3D meter 32, the photographing device 33, the inside temperature detector 34, the memory 41, the control panel 42, and the display 43) of the heating cooker 10, and transmit/receive information to/from the individual components of the heating cooker 10. The controller 50 may control the individual components of the heating cooker 10 based on information received from the individual components of the heating cooker 10, thereby controlling operations of the heating cooker 10. For example, the controller 50 may be configured with at least one processor and a memory storing programs or information for operating the processor.

In the heating cooker 10, driving for low-temperature heating or driving for high-temperature heating may be performed. During driving for low-temperature heating, the heating portion 20 may heat the inside of the heating space S. During driving for high-temperature heating, the heating portion 20 may heat the inside of the heating space S such that an average increase velocity of a reference temperature of a food material OB is higher than an average increase velocity of the reference temperature of the food material OB during driving for low-temperature heating. Also, the reference temperature of the food material OB may include at least one of a surface temperature T1 or an inside temperature T2 of the food material OB.

The controller 50 may control the heating portion 20 such that driving for high-temperature heating is performed after driving for low-temperature heating is performed.

The controller 50 may control the heating portion 20 to heat the inside of the heating space S such that the average increase velocity of the reference temperature of the food material OB during driving for low-temperature heating is lower than the average increase velocity of the reference temperature of the food material OB during driving for high-temperature heating.

Also, when a predetermined driving switching condition is satisfied during driving for low-temperature heating, the controller 50 may control the heating portion 20 to terminate the driving for low-temperature heating and start driving for high-temperature heating. When a predetermined driving completion condition is satisfied during the driving for high-temperature heating, the controller 50 may control the heating portion 20 to terminate the driving for high-temperature heating. The predetermined driving switching condition and the predetermined driving completion condition will be described in detail, later.

Also, the controller 50 may set a driving switching condition according to at least one of a kind or size of a food material OB. Likewise, the controller 50 may set a driving completion condition according to at least one of a kind or size of a food material OB.

Also, the controller 50 may set an output of the heating portion 20 for at least one (in the current embodiment, both driving for low-temperature heating and driving for high-temperature heating) of driving for low-temperature heating or driving for high-temperature heating, according to at least one of a kind or size of a food material OB.

Also, according to an embodiment, the controller 50 may derive an inside temperature T2 of a food material OB based on a surface temperature T1 of the food material OB measured by the thermometer 31. In this way, the controller 50 may acquire the surface temperature T1 and the inside temperature T2 of the food material OB.

Also, according to an embodiment, the controller 50 may adjust a number of heaters being driven among the first heater 21, the second heater 22, and the third heater 23 included in the heating portion 20 and outputs of the heaters being driven, thereby adjusting an output of the heating portion 20. Also, the controller 50 may switch a driving state of a heater being in a driving state among the first heater 21, the second heater 22, and the third heater 23 included in the heating portion 20 between the continuous driving state and the intermittent driving state, thereby adjusting an output of the heater. Also, the controller 50 may adjust a ratio of a driving time period to a driving cycle of a heater being in the intermittent driving state among the first heater 21, the second heater 22, and the third heater 23 included in the heating portion 20, thereby adjusting an output of the heater.

Successively, the heating cooking models stored in the memory 41 will be described. As described above, the plurality of heating cooking models set according to the combinations of the kinds and sizes of the food materials OB may be stored in the memory 41. Each heating cooking model may include a driving switching condition, a driving completion condition, a driving condition of driving for low-temperature heating, and a driving condition of driving for high-temperature heating.

The driving switching condition may be a condition for switching driving for low-temperature heating to driving for high-temperature heating. According to an embodiment, the driving switching condition may be a condition (a first switching condition) that an inside temperature T2 of a food material OB reaches a predetermined switching inside temperature Tsw. A heating cooking model may include the predetermined switching inside temperature Tsw that is used as a criterion for determining whether the driving switching condition is satisfied.

Also, the driving switching condition included in the heating cooking model may be set to a condition that is suitable for at least one of a kind or size of a food material OB corresponding to the heating cooking model. That is, the driving switching condition may be set according to at least one of a kind or size of a food material OB. In the current embodiment, the predetermined switching inside temperature Tsw included in the heating cooking model may be set according to at least one of the kind or size of the food material OB corresponding to the heating cooking model. For example, as the size of the food material OB increases, the predetermined switching inside temperature Tsw may also increase.

The controller 50 may determine a heating cooking model corresponding to a kind and size of a food material OB to be heated and cooked from among the plurality of heating cooking models, and determine a driving switching condition based on the determined heating cooking model. That is, the controller 50 may set a driving switching condition (in the current embodiment, the predetermined switching inside temperature Tsw) according to at least one of a kind or size of a food material OB.

Also, the predetermined switching inside temperature Tsw may be derived based on a target inside temperature Te2 (which will be described later) of the food material OB, an average increase velocity (predicted velocity) of the inside temperature T2 of the food material OB during driving for low-temperature heating (which will be described later) predicted from an output (target output) of the heating portion 20 for driving for low-temperature heating, and an average increase velocity (predicted value) of the inside temperature T2 of the food material OB during driving for high-temperature heating (which will be described later) predicted from an output (target output) of the heating portion 20 for driving for high-temperature heating.

The driving completion condition may be a condition for terminating driving for high-temperature heating. According to an embodiment, the driving completion condition may be a condition (a first completion condition) that a surface temperature T1 of a food material OB reaches a predetermined target surface temperature Te1 and an inside temperature T2 of the food material OB reaches a predetermined target inside temperature Te2. A heating cooking model may include the target surface temperature Te1 and the target inside temperature Te2 that are used as a criterion for determining whether the driving completion condition is satisfied.

Also, the driving completion condition included in the heating cooking model may be set to a condition that is suitable for at least one of a kind or size of a food material OB corresponding to the heating cooking model. That is, the driving completion condition may be set according to at least one of a kind or size of a food material OB. In the current embodiment, the target surface temperature Te1 and the target inside temperature Te2 included in the heating cooking model may be set according to at least one of a kind or size of a food material OB corresponding to the heating cooking model.

The controller 50 may determine a heating cooking model corresponding to a kind and size of a food material OB to be heated and cooked from among the plurality of heating cooking models, and determine a driving completion condition based on the determined heating cooking model. That is, the controller 50 may set a driving completion condition (in the current embodiment, the target surface temperature Te1 and the target inside temperature Te2) according to at least one of a kind or size of a food material OB.

Also, the target surface temperature Te1 may be set to a temperature (for example, 160° C. to 180° C.) at which the surface of the food material OB is sufficiently heated without being burned. The target inside temperature Te2 may be set to a temperature (for example, 58° C. or higher) at which the inside of the food material OB is sufficiently heated and sterilized.

A driving condition of driving for low-temperature heating may include an output (target output) of the heating portion 20 for driving for low-temperature heating. The output of the heating portion 20 for driving for low-temperature heating may be set such that an average increase velocity of a reference temperature (one of a surface temperature T1 and an inside temperature T2) of a food material OB during driving for low-temperature heating is lower than an average increase velocity of the reference temperature of the food material OB during driving for high-temperature heating. For example, the output of the heating portion 20 for driving for low-temperature heating may be set such that the average increase velocity of the reference temperature of the food material OB is within a predetermined allowable velocity range. For example, the predetermined allowable velocity range may be set to a velocity range capable of preventing quality deterioration (a phenomenon in which the surface of the food material OB is burned or the food material OB becomes excessively hardened) of the food material OB due to a rapid rise in reference temperature of the food material OB.

The output of the heating portion 20 for driving for low-temperature heating, included in the heating cooking model, may be set to an output that is suitable for at least one of a kind or size of a food material OB corresponding to the heating cooking model. That is, the output of the heating portion 20 for driving for low-temperature heating may be set according to at least one of a kind or size of a food material OB. For example, as the size of the food material OB increases, the output of the heating portion 20 for driving for low-temperature heating may also increase.

The controller 50 may determine a heating cooking model corresponding to a kind or size of a food material OB to be heated and cooked from among the plurality of heating cooking models, and determine an output (target output) of the heating portion 20 for driving for low-temperature heating based on the determined heating cooking model. That is, the controller 50 may set an output (target output) of the heating portion 20 for driving for low-temperature heating according to at least one of a kind or size of a food material OB.

A driving condition of driving for high-temperature heating may include an output (target output) of the heating portion 20 for driving for high-temperature heating. The output of the heating portion 20 for driving for high-temperature heating may be set such that an average increase velocity of a reference temperature (one of a surface temperature T1 and an inside temperature T2) of a food material OB during driving for high-temperature heating is higher than an average increase velocity of the reference temperature of the food material OB during driving for low-temperature heating.

Also, the output of the heating portion 20 for driving for high-temperature heating, included in the heating cooking model, may be set to an output that is suitable for at least one of a kind or size of a food material OB corresponding to the heating cooking model. That is, the output of the heating portion 20 for driving for high-temperature heating may be set according to at least one of a kind or size of a food material OB. For example, as the size of the food material OB increases, the output of the heating portion 20 for driving for high-temperature heating may also increase.

The controller 50 may determine a heating cooking model corresponding to a kind and size of a food material to be heated and cooked among from the plurality of heating cooking models, and determine an output (target output) of the heating portion 20 for driving for high-temperature heating based on the determined heating cooking model. That is, the controller 50 may set an output (target output) of the heating portion 20 for driving for high-temperature heating according to at least one of a kind or size of a food material OB.

Figure 4:
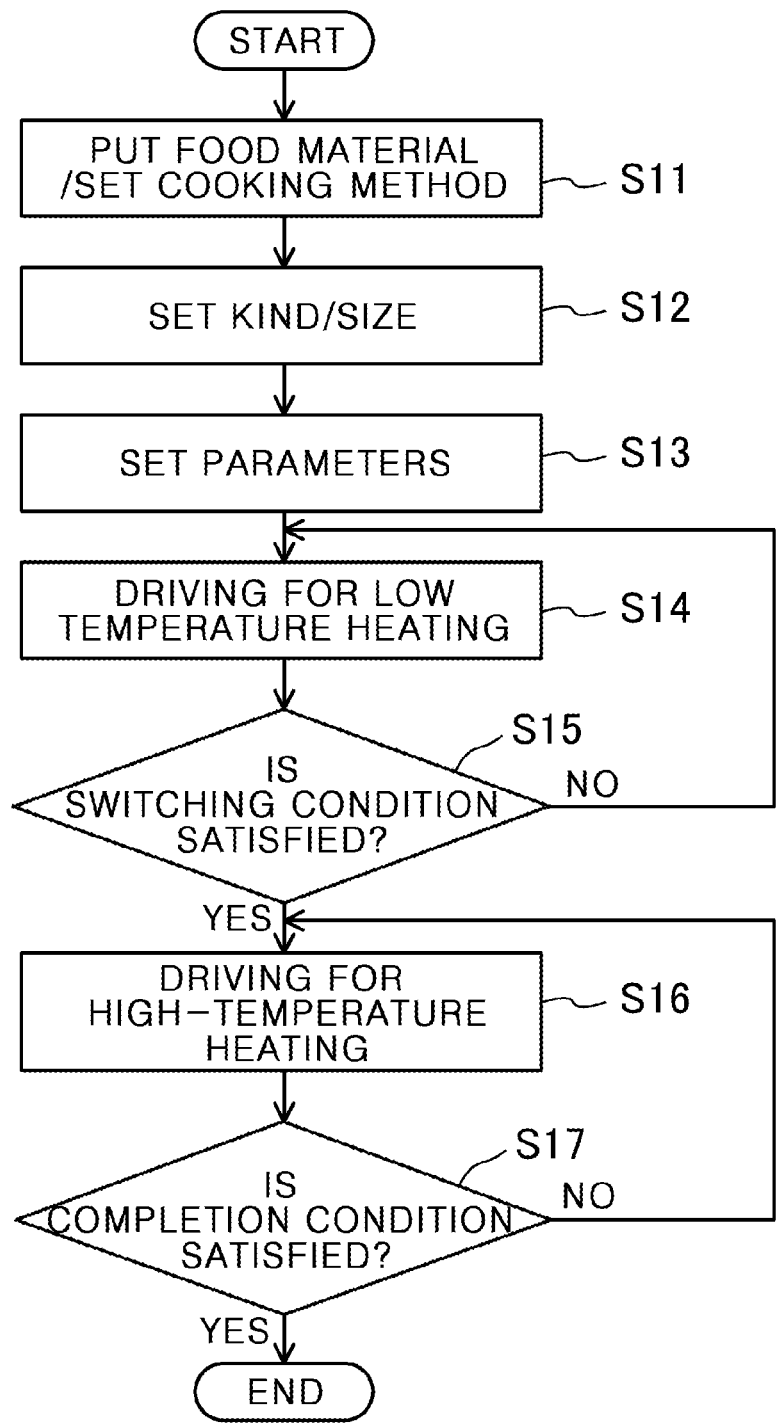
FIG. 4 illustrates a flowchart for describing operations of the heating cooker according to the first embodiment.

Successively, an operation of the heating cooker 10 according to the first embodiment will be described with reference to FIG. 4.

First, at step S11, a food material OB may be put in the heating space S. Then, a user may input an operation for designating a cooking method of the food material OB to the control panel 42. The controller 50 may identify the cooking method of the food material OB placed in the heating space S based on the operation input to the control panel 42. In the current embodiment, as the cooking method of the food material OB, heating cooking may be designated.

Successively, at step S12, the 3D meter 32 may measure a 3D shape of the food material OB placed in the heating space S, and derive 3D information representing the 3D shape of the food material OB. The photographing device 33 may photograph an area (an area to be photographed) including the food material OB placed in the heating space S, and derive a photographed image including the food material OB. The controller 50 may compare the photographed image derived by the photographing device 33 to a plurality of photographed images according to a plurality of kinds of food materials OB stored in the memory 41, and determine a kind of the food material OB placed in the heating space S based on the compared result. Also, the controller 50 may determine a size of the food material OB placed in the heating space S based on the 3D information derived by the 3D meter 32.

Successively, at step S13 the controller 50 may determine various control parameters for heating cooking based on the kind and size of the food material OB determined in step S12. More specifically, the controller 50 may determine a heating cooking model corresponding to a combination of the kind and size of the food material OB determined in step S12 from among the plurality of heating cooking models stored in the memory 41, and determine a driving switching condition, a driving completion condition, a driving condition (an output of the heating portion 20 for driving for low-temperature heating) of driving for low-temperature heating, and a driving condition (an output of the heating portion 20 for driving for high-temperature heating) of driving for high-temperature heating based on the determined heating cooking model.

At step S14, the controller 50 may control the heating portion 20 to perform driving for low-temperature heating. More specifically, the controller 50 may control the heating portion 20 such that an output of the heating portion 20 becomes an output (target output) of the heating portion 20 for driving for low-temperature heating.

At step S15, the controller 50 may determine whether the driving switching condition is satisfied. In the current embodiment, when an inside temperature T2 of the food material OB reaches a switching inside temperature Tsw, the controller 50 may determine that the driving switching condition is satisfied. When the controller 50 determines that the driving switching condition is not satisfied, the controller 50 may proceed to step S15. Accordingly, driving for low-temperature heating may continue until the driving switching condition is satisfied. Meanwhile, when the controller 50 determines that the driving switching condition is satisfied, the controller 50 may proceed to step S16.

At step S16, the controller 50 may control the heating portion 20 to perform driving for high-temperature heating. More specifically, the controller 50 may control the heating portion 20 such that an output of the heating portion 20 becomes an output (target output) of the heating portion 20 for driving for high-temperature heating.

At step S17, the controller 50 may determine whether the driving completion condition is satisfied. In the current embodiment, when a surface temperature T1 of the food material OB reaches the target surface temperature Te1 and an inside temperature T2 of the food material OB reaches the target inside temperature Te2, the controller 50 may determine that the driving completion condition is satisfied. When the controller 50 determines that the driving completion condition is not satisfied, the controller 50 may proceed to step S16. Accordingly, driving for high-temperature heating may continue until the driving completion condition is satisfied. Meanwhile, when the controller 50 determines that the driving completion condition is satisfied, the controller 50 may terminate driving.

Successively, referring to FIG. 5, an example of an operation of the heating cooker 10 according to the first embodiment will be described. Also, in the current example, an output of the second heater 22 which is in a continuous driving state may be set to be higher than an output of the first heater 21 which is in a continuous driving state. An output of the third heater 23 which is in a continuous driving state may be set to be higher than the output of the first heater 21 which is in a continuous driving state and lower than the output of the second heater 22 which is in a continuous driving state.

At a time t0, driving for low-temperature heating may start. In the current example, the first heater 21 and the third heater 23 may become a driving state (more specifically, a continuous driving state). Accordingly, the heating space S may start being heated.

During a time period from the time t0 to a time t1, driving for low-temperature heating may continue. Accordingly, an inside temperature of the heating space S may rise gradually, and a surface temperature T1 and an inside temperature T2 of a food material OB placed in the heating space S may also rise gradually. Also, in the current example, a reference temperature (one of the surface temperature T1 and the inside temperature T2) of the food material OB during driving for low-temperature heating may be within a predetermined allowable temperature range.

At the time t1, the inside temperature T2 of the food material OB may reach a switching inside temperature Tsw. Therefore, a driving switching condition may be satisfied so that the driving for low-temperature heating may terminate and driving for high-temperature heating may start. In the current example, the second heater 22 may be switched to a driving state (more specifically, a continuous driving state) from a stop state, and an output of the heating portion 20 may increase.

During a time period from the time t1 to a time t2, the driving for high-temperature heating may continue. Accordingly, the inside temperature of the heating space S may rise rapidly so that the surface temperature T1 and inside temperature T2 of the food material OB placed in the heating space S may also rise rapidly. Also, an average increase velocity of the inside temperature T2 of the food material OB during the driving for high-temperature heating may be higher than the average increase velocity of the inside temperature T2 of the food material OB during the driving for low-temperature heating.

At the time t2, the inside temperature T2 of the food material OB may reach a target inside temperature Te2. Also, in the current example, the surface temperature T1 of the food material OB may reach the target surface temperature Te1 before the time t2. Accordingly, at the time t2, the driving completion condition may be satisfied so that the driving for high-temperature heating may terminate.

Figure 5:
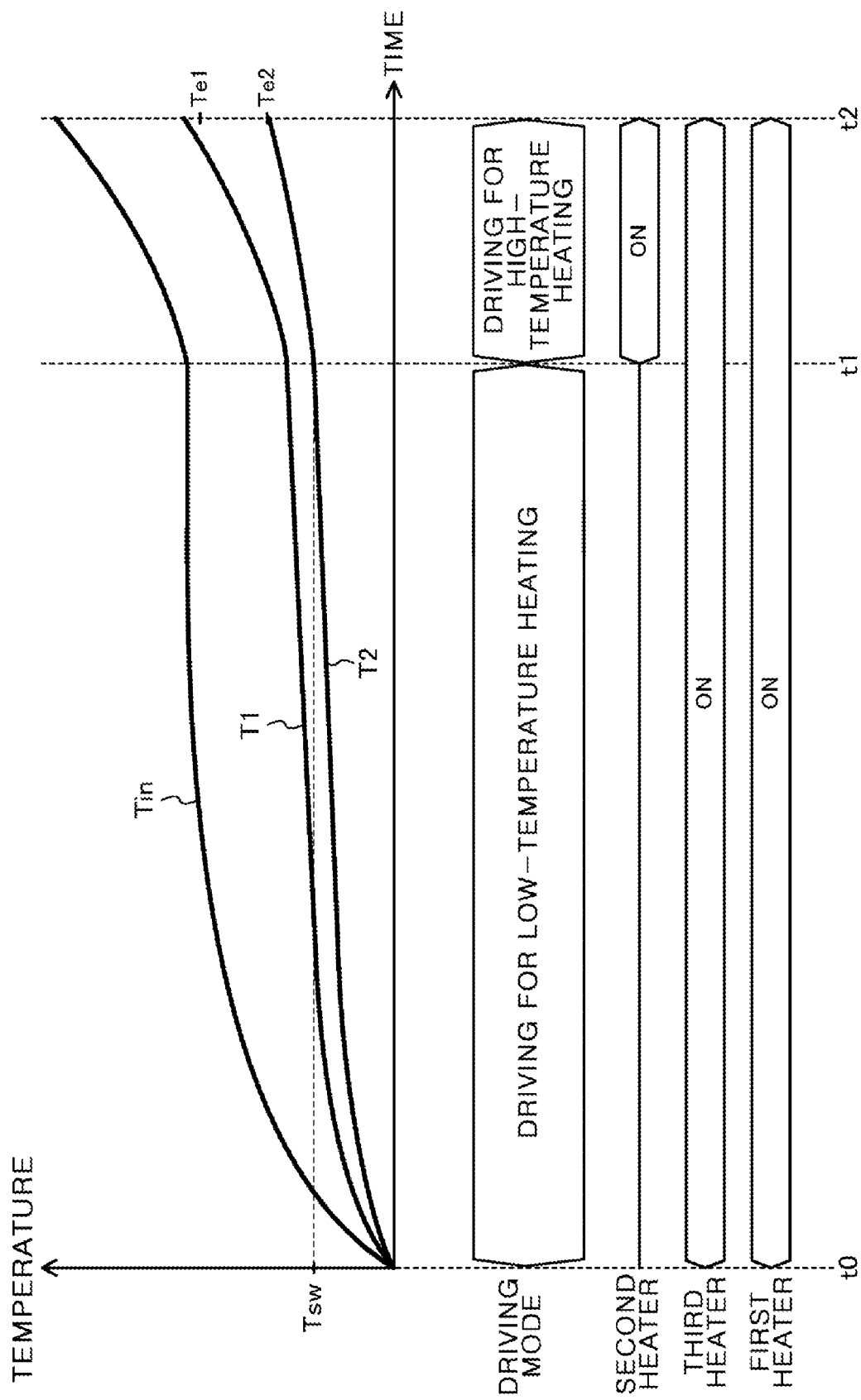
FIG. 5 illustrates a timing diagram showing operations of the heating cooker according to the first embodiment.

Also, in the example of FIG. 5, a length of a driving period (the time period from the time t1 to the time t2) for high-temperature heating for which driving for high-temperature heating is performed may be shorter than a length of a driving period (the time period from the time t0 to the time t1) for low-temperature heating for which driving for low-temperature heating is performed.

As described above, by controlling the heating portion 20 such that after driving for low-temperature heating is performed, driving for high-temperature heating is performed, it may be possible to rapidly increase the surface temperature T1 and inside temperature T2 of the food material OB during driving for high-temperature heating after gradually increasing the surface temperature T1 and inside temperature T2 of the food material OB during driving for low-temperature heating. By gradually increasing the surface temperature T1 and inside temperature T2 of the food material OB during the driving for low-temperature heating, it may be possible to prevent quality deterioration (for example, a phenomenon in which the surface of the food material OB is burned or the food material OB becomes excessively hardened) of the food material OB due to a rapid rise in temperature of the food material OB. Also, by rapidly increasing the surface temperature T1 and inside temperature T2 of the food material OB during the driving for high-temperature heating, it may be possible to finely adjust the surface temperature T1 and inside temperature T2 of the food material OB such that the temperature (the surface temperature T1 and the inside temperature T2) of the food material OB reaches a target temperature. Thereby, it may be possible to appropriately manage the surface temperature T1 and inside temperature T2 of the food material OB.

Also, by controlling the heating portion 20 to terminate driving for low-temperature heating and start driving for high-temperature heating when the driving switching condition is satisfied during the driving for low-temperature heating and to terminate the driving for high-temperature heating when the driving completion condition is satisfied during the driving for high-temperature heating, it may be possible to appropriately perform driving for low-temperature heating and driving for high-temperature heating based on the driving switching condition and the driving completion condition.

Also, by setting the driving switching condition to a first switching condition (a condition that the inside temperature T2 of the food material OB reaches the switching inside temperature Tsw), it may be possible to appropriately perform switching from driving for low-temperature heating to driving for high-temperature heating based on the inside temperature T2 of the food material OB Also, by setting the driving completion condition to a first completion condition (a condition that the surface temperature T1 of the food material OB reaches the target surface temperature Te1 and the inside temperature T2 of the food material OB reaches the target inside temperature Te2), it may be possible to appropriately terminate driving for high-temperature heating based on the surface temperature T1 and inside temperature T2 of the food material OB.

Also, by setting a driving switching condition according to at least one of a kind or size of a food material OB, it may be possible to appropriately set a driving switching condition according to at least one of a kind or size of a food material OB.

Also, by setting an output of the heating portion 20 for at least one (in the current example, both driving for low-temperature heating and driving for high-temperature heating) of driving for low-temperature heating or driving for high-temperature heating according to at least one of a kind or size of a food material OB, it may be possible to set an output of the heating portion 20 for at least one (in the current example, both of driving for low-temperature heating and driving for high-temperature heating) of driving for low-temperature heating or driving for high-temperature heating according to at least one of a kind or size of a food material OB.

The heating cooker 10 according to a second embodiment may be different from the heating cooker 10 according to the first embodiment in view of details of driving for low-temperature heating and driving for high-temperature heating. In the second embodiment, a first low-temperature heating control and a second low-temperature heating control may be performed for driving for low-temperature heating, and a first high-temperature heating control and a second high-temperature heating control may be performed for driving for high-temperature heating. Also, in the second embodiment, a steam generation control may be performed during driving for low-temperature heating. Also, a configuration of the heating cooker 10 according to the second embodiment may be the same as that of the heating cooker 10 according to the first embodiment.

The controller 50 may perform a steam generation control during driving for low-temperature heating. For the steam generation control, the controller 50 may control the steam generator 25 to generate steam in the heating space S. In the current embodiment, the controller 50 may start a steam generation control when a predetermined steam generation condition is satisfied during driving for low-temperature heating. More specifically, when an inside temperature Tin (inside temperature of the heating space S) exceeds a predetermined steam generation start temperature Tstm during driving for low-temperature heating, the controller 50 may control the steam generator 25 to generate steam in the heating space S. Also, when a predetermined steam generation termination condition is satisfied, the controller 50 may terminate the steam generation control. More specifically, when the inside temperature Tin exceeds a steam generation termination temperature that is higher than the predetermined steam generation start temperature Tstm, the controller 50 may control the steam generator 25 to stop generating steam in the heating space S. Also, the steam generation start condition and the steam generation termination condition will be described in detail, later.

Also, the controller 50 may perform the first low-temperature heating control and the second low-temperature heating control during driving for low-temperature heating. More specifically, the controller 50 may perform the first low-temperature heating control until a predetermined low-temperature heating switching condition is satisfied during driving for low-temperature heating, and when the predetermined low-temperature heating switching condition is satisfied during driving for low-temperature heating, the controller 50 may perform the second low-temperature heating control. For the first low-temperature heating control, the controller 50 may control the heating portion 20 such that an increase velocity of a reference temperature (one of a surface temperature T1 and an inside temperature T2) of a food material OB is within a predetermined allowable velocity range in a predetermined time period. For the second low-temperature heating control, the controller 50 may control the heating portion 20 such that the inside temperature Tin (inside temperature of the heating space S) is within a predetermined allowable temperature range. Also, the low-temperature heating switching condition will be described in detail, later.

Also, the controller 50 may perform the first high-temperature heating control and the second high-temperature heating control during driving for high-temperature heating. More specifically, the controller 50 may perform the first high-temperature heating control until a predetermined high-temperature heating switching condition is satisfied during driving for high-temperature heating, and when the predetermined high-temperature heating switching condition is satisfied during driving for high-temperature heating, the controller 50 may perform the second high-temperature heating control. For the first high-temperature heating control, the controller 50 may control the heating portion 20 such that an average increase velocity of a reference temperature (one of a surface temperature T1 and an inside temperature T2) of a food material OB is higher than an average increase velocity of the reference temperature of the food material OB during driving for low-temperature heating. For the second high-temperature heating control, the controller 50 may control the heating portion 20 such that the average increase velocity of the reference temperature of the food material OB is higher than the average increase velocity of the reference temperature of the food material OB during the driving for low-temperature heating and an output of the heating portion 20 is different from an output of the heating portion 20 for the first high-temperature heating control. Also, the high-temperature heating switching condition will be described in detail, later.

In the second embodiment, heating cooking models (heating cooking models set according to combinations of kinds and sizes of food materials OB) stored in the memory 41 may include a driving switching condition, a driving completion condition, a steam generation start condition, a steam generation termination condition, a low-temperature heating switching condition, a high-temperature heating switching condition, a driving condition of a first low-temperature heating control, a driving condition of a second low-temperature heating control, a driving condition of a first high-temperature heating control, and a driving condition of a second high-temperature heating control. Also, the driving switching condition and the driving completion condition in the second embodiment may be the same as the driving switching condition and the driving completion condition in the first embodiment.

The steam generation start condition may be a condition for starting a steam generation control for generating steam in the heating space S. In the current embodiment, the steam generation start condition may be a condition that an inside temperature Tin exceeds a predetermined steam generation start temperature Tstm. A heating cooking model may include the steam generation start temperature Tstm that is used as a criterion for determining whether the steam generation start condition is satisfied.

Also, the steam generation start condition included in the heating cooking model may be set to a condition that is suitable for at least one of a kind or size of a food material OB corresponding to the heating cooking model. That is, the steam generation start condition may be set according to at least one of a kind or size of a food material OB. In the current embodiment, the steam generation start temperature Tstm included in the heating cooking model may be set according to at least one of a kind or size of a food material corresponding to the heating cooking model.

The controller 50 may determine a heating cooking model corresponding to a kind and size of a food material OB to be heated and cooked from among the plurality of heating cooking models, and determine a steam generation start condition based on the determined heating cooking model. That is, the controller 50 may set a steam generation start condition (in the current embodiment, the steam generation start temperature Tstm) according to at least one of a kind or size of a food material OB.

Also, for example, the steam generation start temperature Tstm may be set to an inside temperature (for example, 120° C.) at which no dew condensation may be generated on a surface of a food material OB placed in the heating space S when steam is generated in the heating space S. In the current embodiment, the steam generation start temperature Tstm may be set to a temperature that is lower than an off temperature Toff which will be described later.

The steam generation termination condition may be a condition for terminating the steam generation control for generating steam in the heating space S. In the current embodiment, the steam generation termination condition may be a condition that one of a first condition that the inside temperature Tin exceeds the steam generation termination temperature, a second condition that the driving switching condition is satisfied, and a third condition that the low-temperature heating switching condition is satisfied is satisfied. A heating cooking model may include the steam generation termination temperature that is used as a criterion for determining whether the steam generation termination condition is satisfied. The steam generation termination temperature may be higher than the steam generation start temperature Tstm.

Also, the steam generation termination condition included in the heating cooking model may be set to a condition that is suitable to at least one of a kind or size of a food material OB corresponding to the heating cooking model. That is, the steam generation termination condition may be set according to at least one of a kind or size of a food material OB. In the current embodiment, the steam generation termination temperature included in the heating cooking model may be set according to at least one of a kind or size of a food material OB corresponding to the heating cooking model.

The controller 50 may determine a heating cooking model corresponding to a kind and size of a food material OB to be heated and cooked from among the plurality of heating cooking models, and determine a steam generation termination condition based on the determined heating cooking model. That is, the controller 50 may set a steam generation termination condition (for example, the steam generation termination temperature) according to at least one of a kind or size of a food material OB.

Also, for example, the steam generation termination temperature may be set to an inside temperature Tin at which the surface of the food material OB may be prevented from being excessively dried by overheated steam supplied to the heating space S. In the current embodiment, the steam generation termination temperature may be set to the off temperature Toff which will be described later. That is, the first condition of the steam generation termination condition may be a condition that the inside temperature Tin exceeds the off temperature Toff.

The low-temperature heating switching condition may be a condition for switching from the first low-temperature heating control to the second low-temperature heating control. In the current embodiment, a driving switching condition may be a condition that an inside temperature Tin reaches a predetermined inside temperature for low-temperature heating switching. The heating cooking model may include an inside temperature for low-temperature heating switching that is used as a criterion for determining whether the low-temperature heating switching condition is satisfied.

Also, the low-temperature heating switching condition included in the heating cooking model may be set to a condition that is suitable for at least one of a kind or size of a food material OB corresponding to the heating cooking model. That is, the low-temperature heating switching condition may be set according to at least one of a kind or size of a food material OB. In the current embodiment, the inside temperature for low-temperature heating switching included in the heating cooking model may be set according to at least one of a kind or size of a food material OB corresponding to the heating cooking model.

The controller 50 may determine a heating cooking model corresponding to a kind and size of a food material OB to be heated and cooked from among the plurality of heating cooking models, and determine a low-temperature heating switching condition based on the determined heating cooking model. That is, the controller 50 may set a low-temperature heating switching condition (in the current embodiment, the inside temperature for low-temperature heating switching) according to at least one of a kind or size of a food material OB.

Also, in the current embodiment, the inside temperature for low-temperature heating switching may be set to the off temperature Toff which will be described later. That is, in the current embodiment, the low-temperature heating switching condition may be a condition that the inside temperature Tin reaches the off temperature Toff, and be the same as the first condition of the steam generation termination condition. Accordingly, when the inside temperature Tin reaches the off temperature Toff, the first low-temperature heating control and the steam generation control may terminate, and the second low-temperature heating control may be performed.

The high-temperature heating switching condition may be a condition for switching from the first high-temperature heating control to the second high-temperature heating control. In the current embodiment, the high-temperature heating switching condition may be a condition that the inside temperature T2 of the food material OB reaches a predetermined inside temperature Tswa for high-temperature heating switching. The heating cooking model may include the predetermined inside temperature Tswa for high-temperature heating switching that is used as a criterion for determining whether the high-temperature heating condition is satisfied.

Also, the high-temperature heating switching condition included in the heating cooking model may be set to a condition that is suitable for at least one of a kind or size of a food material OB corresponding to the heating cooking model. That is, the high-temperature heating switching condition may be set according to at least one of a kind or size of a food material OB. In the current embodiment, the inside temperature Tswa for high-temperature heating switching included in the heating cooking model may be set according to at least one of a kind or size of a food material OB corresponding to the heating cooking model. For example, as the size of the food material OB increases, the inside temperature Tswa for high-temperature heating switching may also increase.

The controller 50 may determine a heating cooking model corresponding to a kind and size of a food material OB to be heated and cooked from among the plurality of heating cooking models, and determine a high-temperature heating switching condition based on the determined heating cooking model. That is, the controller 50 may set a high-temperature heating switching condition (in the current embodiment, the inside temperature Tswa for high-temperature heating switching) according to at least one of a kind or size of a food material OB.

Also, the inside temperature Tswa for high-temperature heating switching may be derived based on a target inside temperature Te2 of a food material OB, a switching inside temperature Tsw that is used as a criterion for determining whether the driving switching condition is satisfied, an average increase velocity (predicted velocity) of an inside temperature T2 of the food material OB during the first high-temperature heating control predicted from an output (target output) of the heating portion 20 for the first high-temperature heating control which will be described later, and an average increase velocity (predicted velocity) of the inside temperature T2 of the food material OB during the second high-temperature heating control predicted from an output (target output) of the heating portion 20 for the second high-temperature heating control which will be described later.

A driving condition for the first low-temperature heating control may include an output (initial output) of the heating portion 20 for the first low-temperature heating control and an allowable velocity range for the first low-temperature heating control.

An output of the heating portion 20 for the first low-temperature heating control may be set such that an average increase velocity of a reference temperature (one of a surface temperature T1 and an inside temperature T2) of a food material OB during the first low-temperature heating control is lower than an average increase velocity of the reference temperature of the food material OB during driving for high-temperature heating. For example, an output of the heating portion 20 for the first low-temperature heating control may be set such that an average increase velocity of a reference temperature of a food material OB is within an allowable velocity range for the first low-temperature heating control which will be described later.

Also, an output of the heating portion 20 for the first low-temperature heating control included in the heating cooking model may be set to an output that is suitable for at least one of a kind or size of a food material OB corresponding to the heating cooking model. That is, an output of the heating portion 20 for the first low-temperature heating control may be set according to at least one of a kind or size of a food material OB. For example, as the size of the food material OB increases, the output of the heating portion 20 for the first low-temperature heating control may also increase.

The controller 50 may determine a heating cooking model corresponding to a kind and size of a food material OB to be heated and cooked from among the plurality of heating cooking models, and determine an output (initial output) of the heating portion 20 for the first low-temperature heating control based on the determined heating cooking model. That is, the controller 50 may set an output (initial output) of the heating portion 20 for the first low-temperature heating control according to at least one of a kind or size of a food material OB.

An allowable velocity range for the first low-temperature heating control may be an allowable velocity range determined with respect to an increase velocity of a reference temperature (one of a surface temperature T1 and an inside temperature T2) of a food material OB within a predetermined time period. The allowable velocity range may be set to a velocity range capable of preventing quality deterioration (a phenomenon in which a surface of a food material OB is burned or the food material OB becomes excessively hardened) of a food material OB due to a rapid rise in reference temperature of the food material OB. The heating cooking model may include an upper limit VH of allowable velocity which is an upper limit of the allowable velocity range and a lower limit VL of allowable velocity which is a lower limit of the allowable velocity range.

Also, the allowable velocity range for the first low-temperature heating control, included in the heating cooking model, may be set to a range that is suitable for at least one of a kind or size of a food material OB corresponding to the heating cooking model. That is, the upper limit VH of allowable velocity and the lower limit VL of allowable velocity of the allowable velocity range for the first low-temperature heating control may be set according to at least one of a kind or size of a food material OB.

The controller 50 may determine a heating cooking model corresponding to a kind and size of a food material OB to be heated and cooked from the plurality of heating cooking models, and determine an allowable velocity range for the first low-temperature heating control based on the determined heating cooking model. That is, the controller 50 may set an allowable velocity range for the first low-temperature heating control according to at least one of a kind or size of a food material OB.

The driving condition for the second low-temperature heating control may include an output (target output) of the heating portion 20 for the second low-temperature heating control and an allowable temperature range for the second low-temperature heating control.

An output of the heating portion 20 for the second low-temperature heating control may be set such that an average increase velocity of a reference temperature (one of a surface temperature T1 and an inside temperature T2) of a food material OB during the second low-temperature heating control is lower than an average increase velocity of the reference temperature of the food material OB during driving for high-temperature heating. For example, an output of the heating portion 20 for the second low-temperature heating control may be set such that an average increase velocity of a reference temperature of a food material OB is within a predetermined allowable velocity range. The predetermined allowable velocity range may be set to a velocity range capable of preventing quality deterioration (a phenomenon in which the surface of the food material OB is burned or the food material OB becomes excessively hardened) of a food material OB due to a rapid rise in reference temperature of the food material OB.

Also, an output of the heating portion 20 for the second low-temperature heating control, included in the heating cooking model, may be set to an output that is suitable for at least one of a kind or size of a food material OB corresponding to the heating cooking model. That is, an output of the heating portion 20 for the second low-temperature heating control may be set according to at least one of a kind or size of a food material OB. For example, as the size of the food material OB increases, the output of the heating portion 20 for the second high-temperature heating control may also increase.

The controller 50 may determine a heating cooking model corresponding to a kind and size of a food material OB to be heated and cooked from the plurality of heating cooking models, and determine an output (target output) of the heating portion 20 for the second low-temperature heating control based on the determined heating cooking model. That is, the controller 50 may set an output (target output) of the heating portion 20 for the second low-temperature heating control according to at least one of a kind or size of the food material OB.

An allowable temperature range for the second low-temperature heating control may be an allowable temperature range determined with respect to the inside temperature Tin. For example, the allowable temperature range may be set to a temperature range capable of preventing a surface of a food material OB from being excessively dried due to an excessively high inside temperature Tin and preventing dew condensation from being generated on the surface of the food material OB due to an excessively low inside temperature Tin. The heating cooking model may include an off temperature Toff which is a upper limit of the allowable temperature range, and an on temperature Ton which is a lower limit of the allowable temperature range. For example, the off temperature Toff may be set to 155° C., and the on temperature Ton may be set to 140° C.

Also, the allowable temperature range for the second low-temperature heating control, included in the heating cooking model, may be set to a range that is suitable for at least one of a kind or size of a food material OB corresponding to the heating cooking model. That is, the off temperature Toff and on temperature Ton of the allowable temperature range for the second low-temperature heating control may be set according to at least one of a kind or size of a food material OB.

The controller 50 may determine a heating cooking model corresponding to a kind and size of a food material OB to be heated and cooked from among the plurality of heating cooking models, and determine an allowable temperature range for the second low-temperature heating control based on the determined heating cooking model. That is, the controller 50 may set an allowable temperature range for the second low-temperature heating control according to at least one of a kind or size of a food material OB.

A driving condition for the first high-temperature heating control may include an output (target output) of the heating portion 20 for the first high-temperature heating control. The output of the heating portion 20 for the first high-temperature heating control may be set such that an average increase velocity of a reference temperature (one of a surface temperature T1 and an inside temperature T2) of a food material OB during the first high-temperature heating control is higher than an average increase velocity of the reference temperature of the food material OB during driving for low-temperature heating.

Also, the output of the heating portion 20 for the first high-temperature heating control, included in the heating cooking model, may be set to an output that is suitable for at least one of a kind or size of a food material OB corresponding to the heating cooking model. That is, the output of the heating portion 20 for the first high-temperature heating control may be set according to at least one of a kind or size of a food material OB. For example, as the size of the food material OB increases, the output of the heating portion 20 for the first high-temperature heating control may also increase.

The controller 50 may determine a heating cooking model corresponding to a kind and size of a food material OB to be heated and cooked from among the plurality of heating cooking models, and determine an output (target output) of the heating portion 20 for the first high-temperature heating control based on the determined heating cooking model. That is, the controller 50 may set an output (target output) of the heating portion 20 for the first high-temperature heating control according to at least one of a kind or size of a food material OB.

A driving condition for the second high-temperature heating control may include an output (target output) of the heating portion 20 for the second high-temperature heating control. The output of the heating portion 20 for the second high-temperature heating control may be set such that an average increase velocity of a reference temperature (one of a surface temperature T1 and an inside temperature T2) of a food material OB during the second high-temperature heating control is higher than an average increase velocity of the reference temperature of the food material OB during driving for low-temperature heating and the output of the heating portion 20 for the second high-temperature heating control is different from the output of the heating portion 20 for the first high-temperature heating control.

Also, the output of the heating portion 20 for the second high-temperature heating control, included in the heating cooking model, may be set to an output that is suitable for at least one of a kind or size of a food material OB corresponding to the heating cooking model. That is, the output of the heating portion 20 for the second high-temperature heating control may be set according to at least one of a kind or size of a food material OB. For example, as the size of the food material OB increases, the output of the heating portion 20 for the second high-temperature heating control may also increase.

The controller 50 may determine a heating cooking model corresponding to a kind and size of a food material OB to be heated and cooked from among the plurality of heating cooking models, and determine an output (target output) of the heating portion 20 for the second high-temperature heating control based on the determined heating cooking model. That is, the controller 50 may set an output (target output) of the heating portion 20 for the second high-temperature heating control according to at least one of a kind or size of a food material OB.

Figure 6:
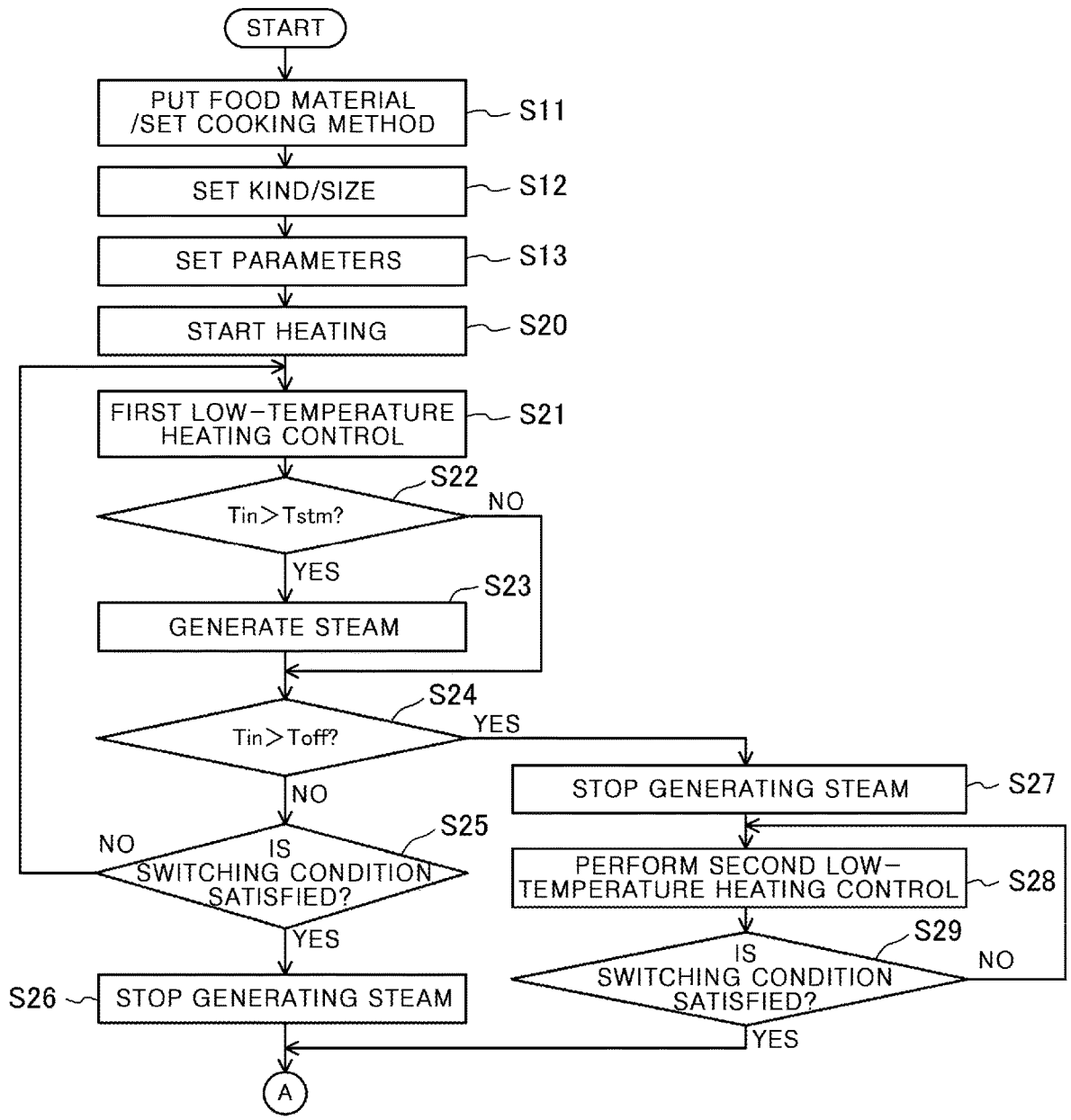
FIG. 6 illustrates a flowchart for describing a part of operations of a heating cooker according to a second embodiment.
Figure 7:
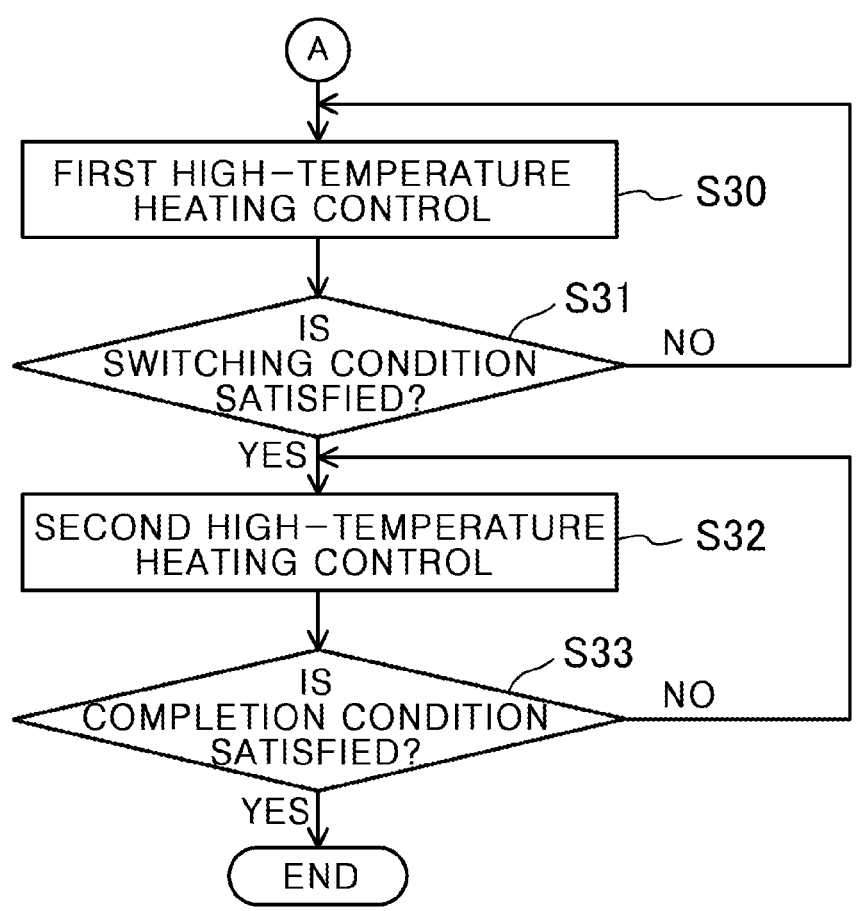
FIG. 7 illustrates a flowchart for describing the remaining part of the operations of the heating cooker according to the second embodiment.

Successively, an operation of the heating cooker 10 according to the second embodiment will be described with reference to FIGS. 6 and 7.

First, like the first embodiment, a food material OB may be put in the heating space S, and heating cooking may be designated as a cooking method of the food material OB, in step S11. Also, a kind of the food material OB placed in the heating space S may be determined, and a size of the food material OB placed in the heating space S may be determined, in step S12. Then, various control parameters for the heating and cooking may be determined based on the kind and size of the food material OB, in step S13. More specifically, the controller 50 may determine a heating cooking model corresponding to a combination of the kind and size of the food material OB determined in step S12 from among the plurality of heating cooking models stored in the memory 41, and determine a driving switching condition, a driving completion condition, a steam generation start condition, a steam generation termination condition, a low-temperature heating switching condition, a high-temperature heating switching condition, a driving condition of a first low-temperature heating control, a driving condition of a second low-temperature heating control, a driving condition of a first high-temperature heating control, and a driving condition of a second high-temperature heating control, based on the determined heating cooking model.

Successively, at step S20, the controller 50 may control the heating portion 20 to start heating the heating space S. More specifically, the controller 50 may control the heating portion 20 such that an output of the heating portion 20 becomes an output (initial output) of the heating portion 20 for the first low-temperature heating control. Then, the controller 50 may proceed to step S21.

At step S21, the controller 50 may perform the first low-temperature heating control. For the first low-temperature heating control, the controller 50 may control the heating portion 20 such that an increase velocity of a reference temperature (one of the surface temperature T1 and the inside temperature T2) of the food material OB in a predetermined time period is within an allowable velocity range for the first low-temperature heating control. Also, the first low-temperature heating control will be described in detail, later.

Successively, at step S22, the controller 50 may determine whether an inside temperature Tin exceeds a steam generation start temperature Tstm. That is, the controller 50 may determine whether the steam generation start condition is satisfied. When the controller 50 determines that the inside temperature Tin exceeds the steam generation start temperature Tstm, that is, that the steam generation start condition is satisfied, the controller 50 may proceed to step S23, and otherwise, the controller 50 may proceed to step S24.

At step S23, when the controller 50 determines that the inside temperature Tin exceeds the steam generation start temperature Tstm, the controller 50 may control the steam generator 25 to generate steam in the heating space S.

Successively, at step S24, the controller 50 may determine whether the inside temperature Tin exceeds an off temperature Toff. That is, the controller 50 may determine whether the low-temperature heating switching condition is satisfied. When the controller 50 determines that the inside temperature Tin does not exceed the off temperature Toff, the controller 50 may proceed to step S25, and when the controller 50 determines that the inside temperature Tin exceeds the off temperature Toff (that is, when the low-temperature heating switching condition is satisfied), the controller 50 may proceed to step S27.

Meanwhile, at step S25, when the controller 50 determines that the inside temperature Tin does not exceed the off temperature Toff, the controller 50 may determine whether the driving switching condition is satisfied. In the current embodiment, when the inside temperature T2 of the food material OB reaches a switching inside temperature Tsw, the controller 50 may determine that the driving switching condition is satisfied. When the controller 50 determines that the driving switching condition is not satisfied, the controller 50 may proceed to step S21. Accordingly, the first low-temperature heating control may continue until any one of the low-temperature heating switching condition (in the current embodiment, a condition that the inside temperature Tin exceeds the off temperature Toff) and the driving switching condition is satisfied. Meanwhile, when the controller 50 determines that the driving switching condition is satisfied, the controller 50 may proceed to step S26.

At step S26, when the controller 50 determines that the driving switching condition is satisfied in step S25, the controller 50 may control the steam generator 25 to stop generating steam in the heating space S. In the current embodiment, when the driving switching condition is satisfied, the steam generation completion condition may be satisfied so that the steam generation control may terminate. Successively, the controller 50 may proceed to step S30 (see FIG. 7).

At step S27, when the controller 50 determines that the inside temperature Tin exceeds the off temperature Toff in operation S24 (that is, when the low-temperature heating condition is satisfied), the controller 50 may control the steam generator 25 to stop generating steam in the heating space S. In the current embodiment, when the low-temperature heating switching condition is satisfied, the steam generation termination condition may be satisfied so that the steam generation control may terminate. Successively, the controller 50 may proceed to step S28.

At step S28, the controller 50 may perform the second low-temperature heating control. For the second low-temperature heating control, the controller 50 may control the heating portion 20 such that the inside temperature Tin is within an allowable temperature range for the second low-temperature heating control. Also, the second low-temperature heating control will be described in detail, later.

Successively, at step S29, the controller 50 may determine whether the driving switching condition is satisfied. When the controller 50 determines that the driving switching condition is not satisfied, the controller 50 may proceed to step S28. Accordingly, the second low-temperature heating control may continue until the driving switching condition is satisfied. Meanwhile, when the driving switching condition is satisfied, the controller 50 may proceed to step S30 (see FIG. 7).

At step S30, the controller 50 may perform the first high-temperature heating control. For the first high-temperature heating control, the controller 50 may control the heating portion 20 such that an average increase velocity of the reference temperature (one of the surface temperature T1 and the inside temperature T2) of the food material OB is higher than an average increase velocity of the reference temperature of the food material OB during driving for low-temperature heating. More specifically, the controller 50 may control the heating portion 20 such that the output of the heating portion 20 becomes the output of the heating portion 20 for the first high-temperature heating control.

Successively, at step S31, the controller 50 may determine whether the high-temperature heating switching condition is satisfied. In the current embodiment, when the inside temperature T2 of the food material OB reaches an inside temperature Tswa for high-temperature heating switching, the controller 50 may determine that the high-temperature heating switching condition is satisfied. When the controller 50 determines that the high-temperature heating switching condition is not satisfied, the controller 50 may proceed to step S30. Accordingly, the first high-temperature heating control may continue until the high-temperature switching condition is satisfied. Meanwhile, when the controller 50 determines that the high-temperature heating switching condition is satisfied, the controller 50 may proceed to step S32.

At step S32, the controller 50 may perform the second high-temperature heating control. For the second high-temperature heating control, the controller 50 may control the heating portion 20 such that an average increase velocity of the reference temperature (one of the surface temperature T1 and the inside temperature T2) of the food material OB is higher than an average increase velocity of the reference temperature of the food material OB during driving for low-temperature heating and the output of the heating portion 20 is different from the output of the heating portion 20 for the first high-temperature heating control. More specifically, the controller 50 may control the heating portion 20 such that the output of the heating portion 20 becomes the output (target output) of the heating portion 20 for the second high-temperature heating control.

Successively, at step S33, the controller 50 may determine whether the driving completion condition is satisfied. In the current embodiment, when the surface temperature T1 of the food material OB reaches a target surface temperature Te1 and the inside temperature T2 of the food material OB reaches a target inside temperature Te2, the controller 50 may determine that the driving completion condition is satisfied. When the controller 50 determines that the driving completion condition is not satisfied, the controller 50 may proceed to step S32. Accordingly, the second high-temperature heating control may continue until the driving completion condition is satisfied. Meanwhile, when the controller 50 determines that the driving completion condition is satisfied, the controller 50 may terminate driving.

Figure 8:
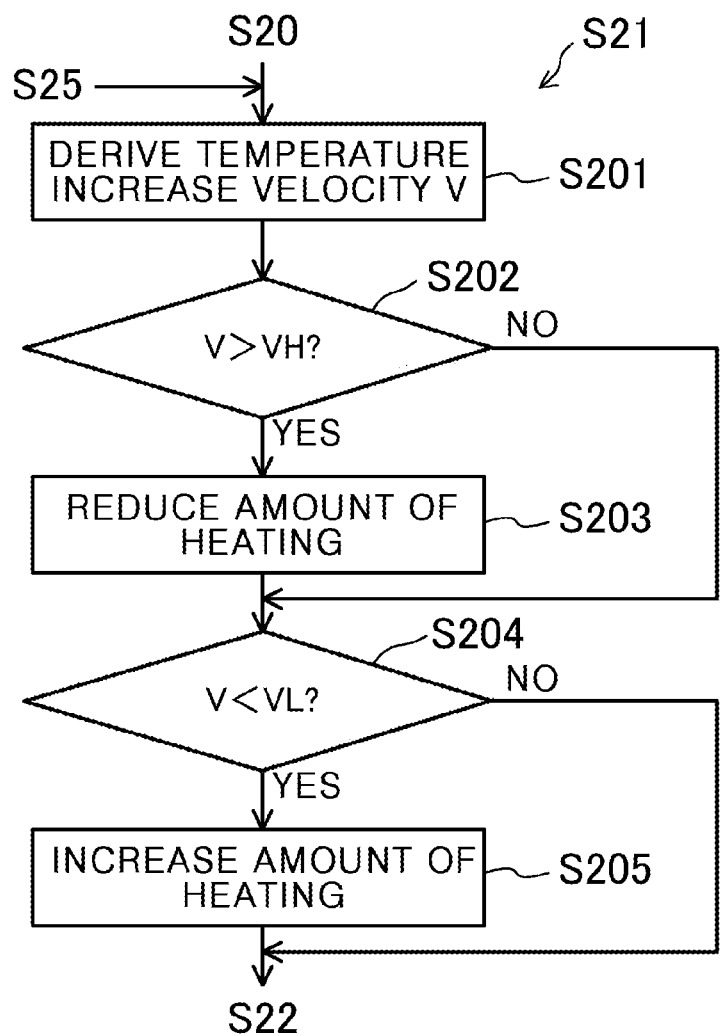
FIG. 8 illustrates a flowchart for describing a first low-temperature heating control.

Successively, details about the first low-temperature heating control will be described with reference to FIG. 8.

At step S201, the controller 50 may derive an increase velocity (hereinafter, referred to as a "temperature increase velocity V") of the reference temperature of the food material OB within a predetermined time period.

Successively, at step S202 the controller 50 may determine whether the temperature increase velocity V exceeds an upper limit VH of allowable velocity which is an upper limit of an allowable velocity range for the first low-temperature heating control. When the controller 50 determines that the temperature increase velocity V exceeds the upper limit VH of allowable velocity which is the upper limit of the allowable velocity range, the controller S203 may proceed to step S203, and otherwise, the controller S203 may proceed to step S204.

At step S203, when the controller 50 determines that the temperature increase velocity V exceeds the upper limit VH of allowable velocity, the controller 50 may lower the output of the heating portion 20 to reduce an amount of heat (an amount of heating) emitted from the heating portion 20 to the heating space S within a predetermined time period.

Successively, at step S204 the controller 50 may determine whether the temperature increase velocity V is lower than the lower limit VL of allowable velocity which is the lower limit of the allowable velocity range for the first low-temperature heating control. When the controller 50 determines that the temperature increase velocity V is lower than the lower limit VL of allowable velocity, the controller 50 may proceed to step S205, and otherwise, the controller 50 may proceed to step S22.

At step S205, when the controller 50 determines that the temperature increase velocity V is lower than the lower limit VL of allowable velocity, the controller 50 may increase the output of the heating portion 20 to increase an amount of heat (an amount of heating) emitted from the heating portion 20 to the heating space S within a predetermined time period. Successively, the controller 50 may proceed to step S22.

Figure 9:
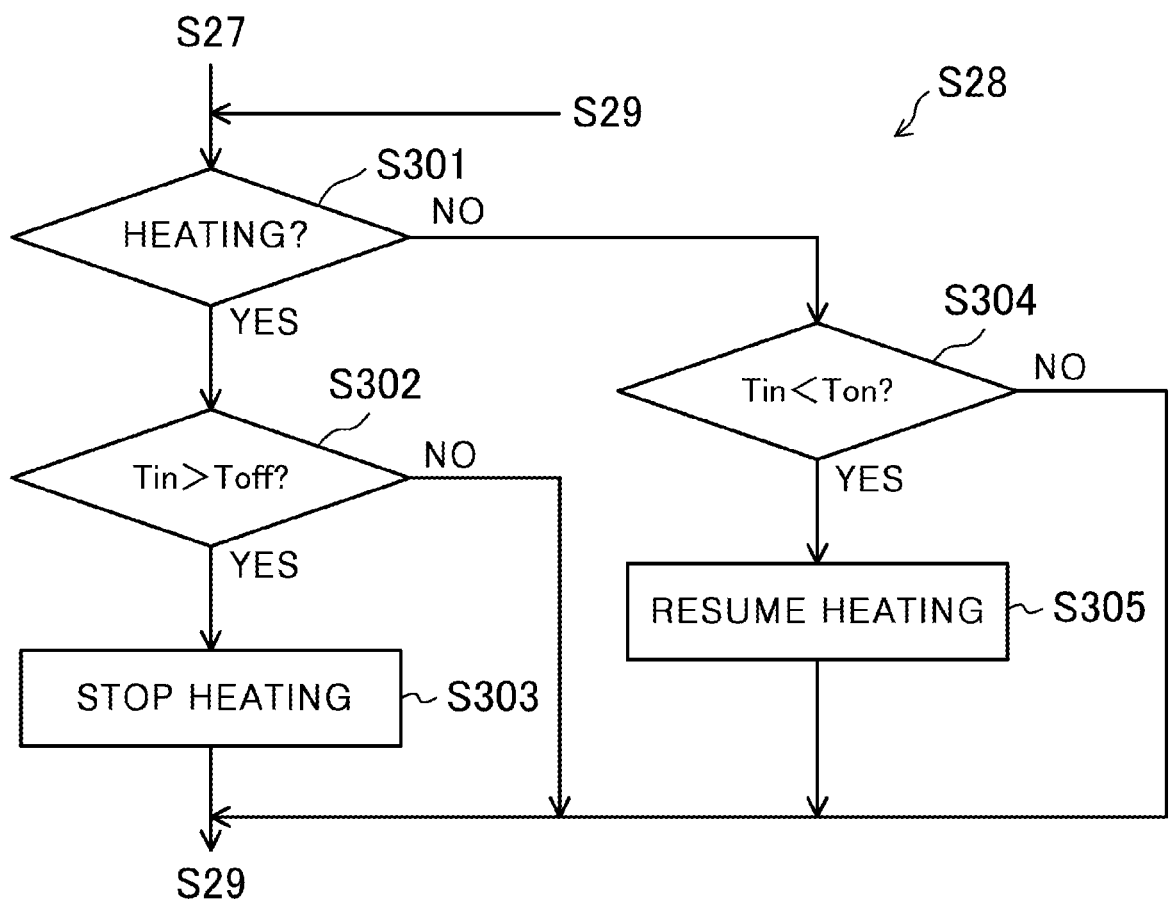
FIG. 9 illustrates a flowchart for describing a second low-temperature heating control.

Successively, details about the second low-temperature heating control will be described with reference to FIG. 9.

At step S301, the controller 50 may determine whether the heating portion 20 is in a driving state. When the controller 50 determines that the heating portion 20 is in a driving state, the controller 50 may proceed to step S302, and when the heating portion 20 is in a stop state, the controller 50 may proceed to step S304.

At step S302, the controller 50 may determine whether the inside temperature Tin exceeds the off temperature Toff which is the upper limit of the allowable temperature range for the second low-temperature heating control. When the controller 50 determines that the inside temperature Tin exceeds the off temperature Toff, the controller 50 may proceed to step S303, and otherwise, the controller 50 may proceed to step S29.

At step S303, the controller 50 may stop the heating portion 20. Successively, the controller 50 may proceed to step S29.

At step S304, when the controller 50 determines that the inside temperature Tin does not exceed the off temperature Toff in operation S301, the controller 50 may determine whether the inside temperature Tin is lower than an on temperature Ton which is a lower limit of the allowable temperature range for the second low-temperature heating control. When the controller 50 determines that the inside temperature Tin is lower than the on temperature Ton, the controller 50 may proceed to step S305, and otherwise, the controller 50 may proceed to step S29.

At step S305, the controller 50 may drive the heating portion 20. Successively, the controller 50 may proceed to step S29.

Successively, an example of an operation of the heating cooker 10 according to the second embodiment will be described with reference to FIG. 10. Also, in the current example, an output of the second heater 22 which is in a continuous driving state may be greater than an output of the first heater 21 which is in a continuous driving state. An output of the third heater 23 which is in a continuous driving state may be greater than the output of the first heater 21 which is in a continuous driving state and smaller than the output of the second heater 22 which is in a continuous driving state.

At a time t0, a first low-temperature heating control of driving for low-temperature heating may start. In the current example, the first heater 21 and the third heater 23 may become a driving state (for example, an intermittent driving state). Accordingly, the heating space S may start being heated.

During a time period from the time t0 to a time t1, the first low-temperature heating control may continue. Accordingly, an inside temperature Tin may rise gradually so that a surface temperature T1 and an inside temperature T2 of a food material OB placed inside the heating space S may rise gradually. Also, an output of the heating portion 20 may be adjusted such that an increase velocity of the inside temperature T2 of the food material OB in a predetermined time period is maintained within an allowable velocity range for the first low-temperature heating control. For example, ratios of driving time periods to driving cycles of the first heater 21 and the third heater 23 that are in an intermittent driving state may be adjusted.

At the time t1, the inside temperature Tin may reach a steam generation start temperature Tstm. Accordingly, a steam generation start condition may be satisfied so that a steam generation control may start, and the steam generator 25 may start emitting steam to the heating space S.

During a time period from the time t1 to a time t2, the first low-temperature heating control may continue. Therefore, the inside temperature of the heating space S may rise gradually so that the surface temperature T1 and inside temperature T2 of the food material OB placed in the heating space S may rise gradually. Also, the steam generation control may continue, and the steam generator 25 may continue to emit steam to the heating space S At the time t2, the inside temperature Tin may reach an off temperature Toff. Accordingly, a low-temperature heating switching condition may be satisfied so that the first low-temperature heating control may terminate and a second low-temperature heating control may start. In the current example, when the inside temperature Tin reaches the off temperature Toff, the first heater 21 and the third heater 23 may stop and the heating portion 20 may stop. Also, a steam generation termination condition may be satisfied so that the steam generation control may terminate and the steam generator 25 may terminate emitting steam to the heating space S.

During a time period from the time t2 to a time t3, the second low-temperature heating control may continue. When the inside temperature Tin is lower than an on temperature Ton which is a lower limit of an allowable temperature range for the second low-temperature heating control, the heating portion 20 (in the current example, the first heater 21 and the third heater 23) may change to a driving state from a stop state, and, when the inside temperature Tin exceeds the off temperature Toff which is a upper limit of an allowable temperature range for the second low-temperature heating control, the heating portion 20 may change to a stop state from the driving state. Accordingly, the inside temperature Tin may be maintained within the allowable temperature range, and the surface temperature T1 and inside temperature T2 of the food material OB placed in the heating space S may rise gradually.

At the time t3, the inside temperature T2 of the food material OB may reach a switching inside temperature Tsw. Accordingly, a driving switching condition may be satisfied, second driving for low-temperature heating of the driving for low-temperature heating may terminate, and a first high-temperature heating control for driving for high-temperature heating may start. In the current example, the first heater 21 may become a stop state and the second heater 22 may become a driving state, so that the output of the heating portion 20 may increase.

During a time period from the time t3 to a time t4, the first high-temperature heating control may be maintained. Accordingly, the inside temperature Tin may rise rapidly so that the surface temperature T1 and inside temperature T2 of the food material OB placed in the heating space S may rise rapidly. Also, an average increase velocity of the inside temperature T2 of the food material OB during the first high-temperature heating control may be higher than an average increase velocity of the inside temperature T2 of the food material OB during driving for low-temperature heating.

At the time t4, the inside temperature T2 of the food material OB may reach an inside temperature Tswa for high-temperature heating switching. Accordingly, a high-temperature heating switching condition may be satisfied so that the first high-temperature heating control may terminate and the second high-temperature heating control may start. In the current example, the third heater 23 may become a stop state, and the output of the heating portion 20 may be lowered.

During a time period from the time t4 to a time t5, the second high-temperature heating control may be maintained. Accordingly, the inside temperature Tin may rise rapidly so that the surface temperature T1 and inside temperature T2 of the food material OB placed in the heating space S may rise rapidly. Also, an average increase velocity of the inside temperature T2 of the food material OB during the second high-temperature heating control may be higher than an average increase velocity of the inside temperature T2 of the food material OB during driving for low-temperature heating.

Figure 10:
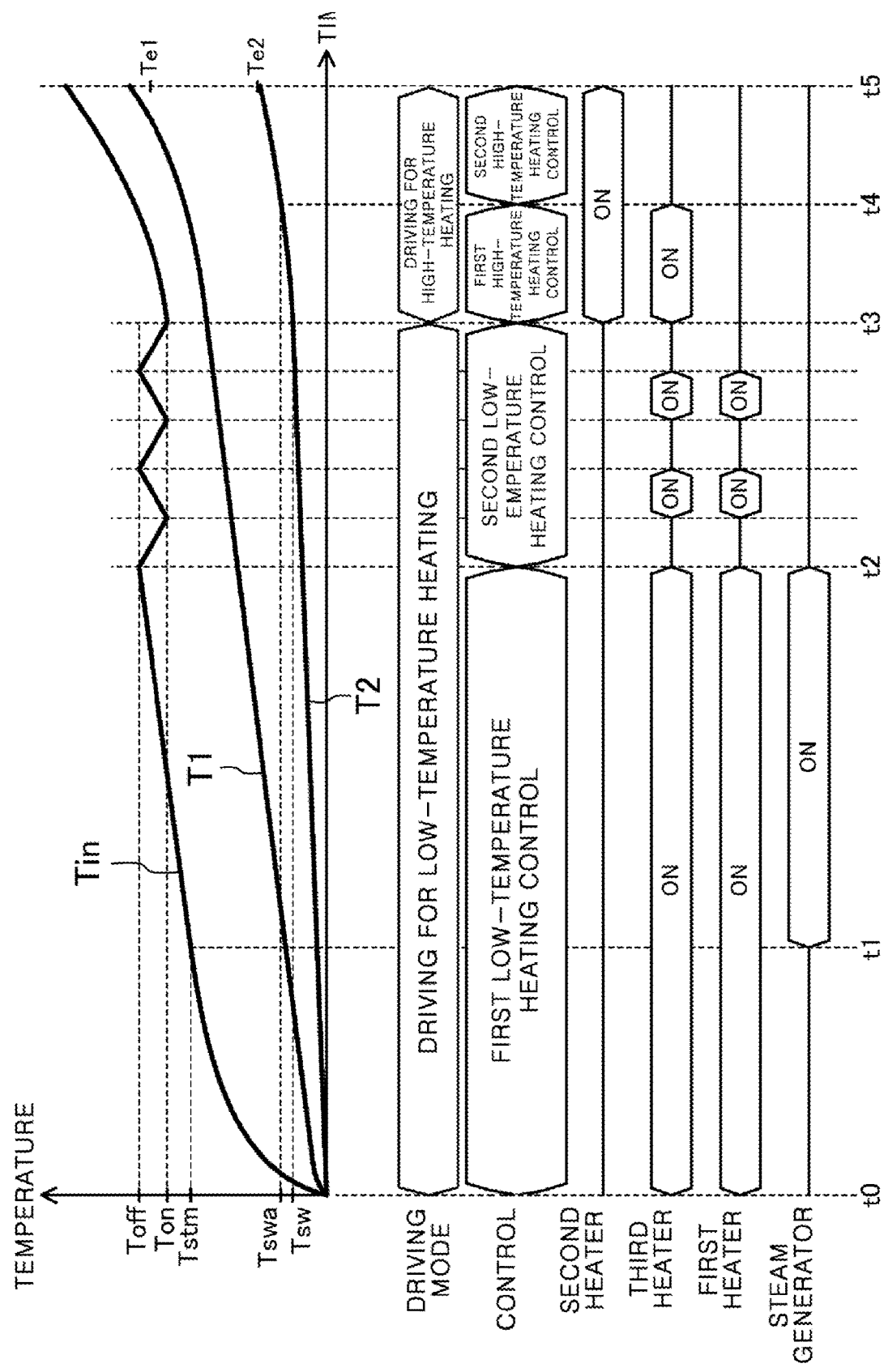
FIG. 10 illustrates a timing diagram showing the operations of the heating cooker according to the second embodiment.

Also, in the example of FIG. 10, a length of a driving period (the time period from the time t3 to the time t5) for high-temperature heating for which driving for high-temperature heating is performed may be shorter than a length of a driving period (the time period from the time t0 to the time t3) for low-temperature heating for which driving for low-temperature heating is performed.

The heating cooker 10 according to the second embodiment may obtain the same effect as that of the heating cooker 10 according to the first embodiment. For example, it may be possible to appropriately manage the surface temperature T1 and inside temperature T2 of the food material OB.

Also, by controlling the steam generator 25 to generate steam in the heating space S during driving for low-temperature heating, heating cooking using steam may be performed. Accordingly, during heating cooking, the food material OB may be prevented from being dried.

Also, when an inside temperature of the heating space S exceeds the steam generation start temperature Tstm during driving for low-temperature heating, the steam generator 25 may be controlled to generate steam in the heating space S, thereby preventing dew condensation from being generated on a surface of a food material OB placed in the heating space S.

Also, when the inside temperature of the heating space S exceeds the steam generation termination temperature, the steam generator 25 may be controlled to stop generating steam in the heating space S, thereby preventing the surface of the food material OB from being excessively dried by overheated steam supplied to the heating space S.

Also, the first low-temperature heating control may be performed until the low-temperature heating switching condition is satisfied during driving for low-temperature heating, and when the low-temperature heating switching condition is satisfied during driving for low-temperature heating, the second low-temperature heating control may be performed so that the temperature of the food material OB may be precisely managed during driving for low-temperature heating.

Also, the first high-temperature heating control may be performed until the high-temperature heating switching condition is satisfied during driving for high-temperature heating, and when the high-temperature heating switching condition is satisfied during driving for high-temperature heating, the second low-temperature heating control may be performed so that the temperature of the food material OB may be precisely managed during driving for high-temperature heating.

The above description relates to a case in which the driving switching condition is the first switching condition (a condition that an inside temperature T2 of a food material OB reaches the predetermined switching inside temperature Tsw). However, the driving switching condition may be a condition (a second switching condition) that a surface temperature T1 of a food material OB reaches the predetermined switching surface temperature, or a condition (a third switching condition) that a time period elapsed from a start time of driving for low-temperature heating reaches a predetermined switching time period.

By setting the driving switching condition to the second switching condition (the condition that a surface temperature T1 of a food material OB reaches the switching surface temperature), it may be possible to appropriately perform switching from driving for low-temperature heating to driving for high-temperature heating based on the surface temperature T1 of the food material OB.

Also, by setting the driving switching condition to the third switching condition (the condition that a time period elapsed from a start time of driving for low-temperature heating reaches the predetermined switching time period), it may be possible to appropriately perform switching from driving for low-temperature heating to driving for high-temperature heating based on a time period elapsed from the start time of driving for low-temperature heating.

Also, the above description relates to a case in which the driving completion condition is the first completion condition (a condition that a surface temperature T1 of a food material OB reaches the predetermined target surface temperature Te1, and an inside temperature T2 of the food material OB reaches the predetermined target inside temperature Te2). However, the driving completion condition may be the condition (second completion condition) that a surface temperature T1 of a food material OB reaches the target surface temperature Te1, or the condition (third completion condition) that an inside temperature T2 of a food material OB reaches the target inside temperature Te2.

By setting the driving completion condition to the second completion condition (the condition that an inside temperature T2 of a food material OB reaches the target inside temperature Te2), it may be possible to appropriately terminate driving for high-temperature heating based on an inside temperature T2 of a food material OB.

Also, by setting the driving completion condition to the third completion condition (the condition that a surface temperature T1 of a food material OB reaches the target surface temperature Te1), it may be possible to appropriately terminate driving for high-temperature heating based on a surface temperature T1 of a food material OB.

The above description relates to a case in which the thermometer 31 measures a surface temperature T1 of a food material OB in a non-contact manner. However, the thermometer 31 may be configured to measure a surface temperature T1 and an inside temperature T2 of a food material OB. For example, the thermometer 31 may include a probe that is inserted into a surface portion of a food material OB to detect a surface temperature of the food material OB, and a probe that is inserted into inside of the food material OB to detect an inside temperature T2 of the food material OB. Results (a surface temperature T1 and an inside temperature T2 of a food material OB measured by the thermometer 31) detected by the thermometer 31 may be transmitted to the controller 50. The controller 50 may receive the results detected by the thermometer 31 to acquire the surface temperature T1 and inside temperature T2 of the food material OB.

Also, the above description relates to a case in which the heating portion (more specifically, the first heater 21, the second heater 22, and the third heater 23 included in the heating portion 20) 20 is a heating wire, an infrared heater, a convection heater, etc. However, the heating portion 20 may be a high-frequency heater that heats a food material OB by irradiating high-frequency waves such as microwaves onto the food material OB.

Also, the above description relates to a case in which the heating portion 20 is configured with a plurality of heaters (more specifically, the first heater 21, the second heater 22, and the third heater 23). However, the heating portion 20 may be configured with a single heater.

Also, a kind designating operation which is an operation for designating a kind of a food material OB may be input to the control panel 42. In this case, the controller 50 may determine a kind of a food material OB placed in the heating space S based on the kind designating operation input to the control panel 42. Likewise, a size designating operation for designating a size of a food material OB may be input to the control panel 42. In this case, the controller 50 may determine a size of a food material OB placed in the heating space S based on the size designating operation input to the control panel 42.

Also, the above description relates to a case in which heating cooking models set according to combinations of kinds and sizes of food materials OB are stored in the memory 41. However, heating cooking models set according to combinations of kinds, sizes, and positions of food materials OB may be stored in the memory 41. Also, the positions of the food materials OB may be positions of the food materials OB in the heating space S. When 3D information derived by the 3D meter 32 includes a position (coordinates) of a food material OB in the heating space S, the position of the food material OB may be calculated from the 3D information.

When the heating cooking models set according to the combinations of the kinds, sizes, and positions of the food materials OB are stored in the memory 41, a driving switching condition included in a heating cooking model may be set to a condition that is suitable for at least one of a kind, size, or position of a food material OB corresponding to the heating cooking model. Another condition (a driving completion condition, a driving condition of driving for low-temperature heating, a driving condition of driving for high-temperature heating, etc.) included in the heating cooking model may also be set in the same way. For example, it may be possible to calculate a contribution level on heating of a food material OB for a position of the food material OB based on a distance to the food material OB from each heater of the heating portion 20 and determine an output of the heating portion 20 according to the contribution level on the heating of the food material OB. More specifically, when a plurality of loading racks 13 are installed vertically in the heating space S, an output of the heating portion 20 may be determined according to a position of a food material OB such that an output of the second heater 22 becomes lower as the position of the food material OB is closer to the second heater 22 positioned in the upper area of the heating space S.

As described above, the controller 50 may set various conditions (for example, the driving switching condition, the driving completion condition, etc.) described above according to at least one of a kind, size, or position of a food material OB. Also, the controller 50 may set various driving conditions (for example, an output of the heating portion 20 for at least one of driving for low-temperature heating or driving for high-temperature heating) described above according to at least one of a kind, size, or position of a food material OB.

According to the disclosure, it may be possible to appropriately manage a surface temperature and inside temperature of a food material.

Also, the above-described embodiments and modified examples may be appropriately combined and performed. The above-described embodiments are intrinsically preferred examples and are not intended to limit the disclosure, applications thereof or the scope of use thereof.

As described above, the disclosure is useful as a heating cooking technique.

Although the present disclosure has been described with various embodiments, various changes and modifications may be suggested to one skilled in the art. It is intended that the present disclosure encompass such changes and modifications as fall within the scope of the appended claims.

What is claimed is:

1. A heating cooker comprising:
a housing forming a heating space where a food material is placed;
a heating portion configured to heat an inside of the heating space; and
at least one processor configured to control the heating portion to:
perform driving for low-temperature heating on the inside of the heating space, and
perform driving for high-temperature heating on the inside of the heating space,
wherein the heating portion is configured to:
heat the inside of the heating space such that an average increase velocity of a reference temperature of the food material during the driving for low-temperature heating is lower than an average increase velocity of the reference temperature of the food material during the driving for high-temperature heating, and
heat the inside of the heating space such that the average increase velocity of the reference temperature of the food material during the driving for high-temperature heating is higher than the average increase velocity of the reference temperature of the food material during the driving for low-temperature heating,
wherein the reference temperature of the food material includes at least one of a surface temperature or an inside temperature of the food material,
wherein the at least one processor is further configured to control the heating portion to: terminate the driving for low-temperature heating and start the driving for high-temperature heating when a predetermined driving switching condition is satisfied during the driving for low-temperature heating, and terminate the driving for high-temperature heating when a predetermined driving completion condition is satisfied during the driving for high-temperature heating,
wherein the predetermined driving switching condition is one of: a first switching condition wherein the inside temperature of the food material reaches a predetermined switching inside temperature, a second switching condition wherein the surface temperature of the food material reaches a predetermined switching surface temperature, or a third switching condition wherein a time period elapsed from a time at which the driving of low-temperature heating starts reaches a predetermined switching time period,
wherein the at least one processor is further configured to set the predetermined driving switching condition based on at least one of a kind, size, or position of the food material, and set the predetermined switching inside temperature to correspond to the predetermined driving switching condition, and
wherein the predetermined switching inside temperature is determined based on a predetermined target inside temperature of the food material, an average increase velocity of the inside temperature of the food material determined according to an output of the heating portion for the driving for low-temperature heating, and an average increase velocity of the inside temperature of the food material determined according to an output of the heating portion for the driving for high-temperature heating.

2. The heating cooker of claim 1, wherein the predetermined driving completion condition is one of:
a first completion condition wherein the surface temperature of the food material reaches a predetermined target surface temperature and the inside temperature of the food material reaches the predetermined target inside temperature,
a second completion condition wherein the inside temperature of the food material reaches the predetermined target inside temperature, or
a third completion condition wherein the surface temperature of the food material reaches the predetermined target surface temperature.

3. The heating cooker of claim 1, wherein:
the at least one processor is further configured to set the predetermined driving completion condition based on at least one of a kind, size, or position of the food material, and set a predetermined target surface temperature and the predetermined target inside temperature to correspond to the predetermined driving completion condition,
the predetermined target surface temperature is a pre-set temperature at which a surface of the food material is heated without being burned, and
the predetermined target inside temperature is a pre-set temperature at which an inside of the food material is heated and sterilized.

4. The heating cooker of claim 1, wherein the at least one processor is further configured to set the output of the heating portion for at least one of the driving for low-temperature heating or the driving for high-temperature heating based on at least one of the kind, size, or position of the food material.

5. The heating cooker of claim 1, wherein:
the heating portion comprises a first heater, a second heater, and a third heater positioned inside the heating space,
an output of the second heater is set to be higher than an output of the first heater, and
an output of the third heater is set to be higher than the output of the first heater and lower than the output of the second heater.

6. The heating cooker of claim 5, wherein the at least one processor is further configured to:
control the first heater and the third heater to operate when the driving for low-temperature heating starts, and
control the first heater, the second heater, and the third heater to operate when the driving for high-temperature heating starts.

7. The heating cooker of claim 1, wherein an operating time period of the driving for high-temperature heating is shorter than an operating time period of the driving for low-temperature heating.

8. The heating cooker of claim 1, further comprising a steam generator configured to generate steam in the heating space.

9. The heating cooker of claim 8, wherein the at least one processor is further configured to control the steam generator to generate steam in the heating space during the driving for low-temperature heating.

10. The heating cooker of claim 9, wherein the at least one processor is further configured to control the steam generator to generate steam in the heating space when an inside temperature of the heating space exceeds a predetermined steam generation start temperature during the driving for low-temperature heating.

11. The heating cooker of claim 10, wherein:
the at least one processor is further configured to control the steam generator to stop generating steam in the heating space when the inside temperature of the heating space exceeds a steam generation termination temperature that is higher than the predetermined steam generation start temperature, and
the predetermined steam generation start temperature and the steam generation termination temperature are determined based on at least one of a kind, size, or position of the food material.

12. A heating cooker of claim 1, comprising:
a housing forming a heating space where a food material is placed;
a heating portion configured to heat an inside of the heating space; and
at least one processor configured to control the heating portion to:
perform driving for low-temperature heating on the inside of the heating space, and
perform driving for high-temperature heating on the inside of the heating space,
wherein the heating portion is configured to: heat the inside of the heating space such that an average increase velocity of a reference temperature of the food material during the driving for low-temperature heating is lower than an average increase velocity of the reference temperature of the food material during the driving for high-temperature heating, and heat the inside of the heating space such that the average increase velocity of the reference temperature of the food material during the driving for high-temperature heating is higher than the average increase velocity of the reference temperature of the food material during the driving for low-temperature heating,
wherein the at least one processor is further configured to:
perform a first low-temperature heating control for controlling the heating portion such that an increase velocity of the reference temperature of the food material is within a predetermined range in a predetermined time period until a predetermined condition for switching the driving for low-temperature heating is satisfied during the driving for low-temperature heating, and
perform, when the predetermined condition for switching the driving for low-temperature heating is satisfied during the driving for low-temperature heating, a second low-temperature heating control for controlling the heating portion such that an inside temperature of the heating space is in a predetermined temperature range,
wherein the predetermined condition for switching the driving for low-temperature heating is a condition that the inside temperature of the heating space reaches a predetermined inside temperature for switching the driving for low-temperature heating, and
wherein the predetermined inside temperature for switching the driving for low-temperature heating is set based on at least one of a kind, size, or position of the food material.

13. A heating cooker of claim 1, comprising:
a housing forming a heating space where a food material is placed;
a heating portion configured to heat an inside of the heating space; and
at least one processor configured to control the heating portion to:
perform driving for low-temperature heating on the inside of the heating space, and
perform driving for high-temperature heating on the inside of the heating space,
wherein the heating portion is configured to: heat the inside of the heating space such that an average increase velocity of a reference temperature of the food material during the driving for low-temperature heating is lower than an average increase velocity of the reference temperature of the food material during the driving for high-temperature heating, and heat the inside of the heating space such that the average increase velocity of the reference temperature of the food material during the driving for high-temperature heating is higher than the average increase velocity of the reference temperature of the food material during the driving for low-temperature heating,
wherein the at least one processor is further configured to:
perform, until a predetermined condition for switching the driving for high-temperature heating is satisfied during the driving for high-temperature heating, a first high-temperature heating control for controlling the heating portion such that an average increase velocity of the reference temperature of the food material is higher than the average increase velocity of the reference temperature of the food material during the driving for low-temperature heating, and
perform, when the predetermined condition for switching the driving for high-temperature heating is satisfied during the driving for high-temperature heating, a second high-temperature heating control for controlling the heating portion such that an average increase velocity of the reference temperature of the food material is higher than the average increase velocity of the reference temperature of the food material during the driving for low-temperature heating and an output of the heating portion is different from an output of the heating portion during the first high-temperature heating control,
wherein the predetermined condition for switching the driving of low-temperature heating is that the inside temperature of the food material reaches a predetermined inside temperature for switching to high-temperature heating, and
wherein the predetermined inside temperature for switching to high-temperature heating is set based on at least one of a kind, size, or position of the food material.

* * * * *